US010425201B2

(12) United States Patent
Kim et al.

(10) Patent No.: US 10,425,201 B2
(45) Date of Patent: Sep. 24, 2019

(54) APPARATUS AND METHOD FOR TRANSMITTING AND RECEIVING SIGNAL IN WIRELESS COMMUNICATION SYSTEM

(71) Applicants: Samsung Electronics Co., Ltd., Suwon-si (KR); THE REGENTS OF THE UNIVERSITY OF CALIFORNIA, Oakland, CA (US)

(72) Inventors: Kwang Taik Kim, Yongin-si (KR); Young-Han Kim, La Jolla, CA (US); Seok-Ki Ahn, Suwon-si (KR); Chiao-Yi Chen, La Jolla, CA (US)

(73) Assignees: Samsung Electronics Co., Ltd., Suwon-si (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 15/416,712

(22) Filed: Jan. 26, 2017

(65) Prior Publication Data
US 2017/0214502 A1    Jul. 27, 2017

(30) Foreign Application Priority Data

Jan. 26, 2016  (KR) .................. 10-2016-0009648
Aug. 11, 2016  (KR) .................. 10-2016-0102615

(51) Int. Cl.
*H04L 5/00* (2006.01)
*H04B 7/06* (2006.01)
(Continued)

(52) U.S. Cl.
CPC ......... *H04L 5/0032* (2013.01); *H04B 7/0478* (2013.01); *H04B 7/0617* (2013.01);
(Continued)

(58) Field of Classification Search
CPC .. H04B 7/0452; H04B 7/0617; H04B 7/0619; H04B 7/0413; H04B 7/0478;
(Continued)

(56) References Cited

U.S. PATENT DOCUMENTS

2007/0195907 A1 *  8/2007  Wang ............... H04L 1/0006
                                             375/267
2007/0250638 A1    10/2007  Kiran et al.
(Continued)

FOREIGN PATENT DOCUMENTS

KR    10-2016-0115556 A    10/2016

OTHER PUBLICATIONS

Wang et al., Sliding-Window Superposition Coding for Interference Networks, 2014 IEEE International Symposium on Information Theory, 2014, pp. 2749-2753, 978-1-4799-5186-4/14, IEEE.
(Continued)

*Primary Examiner* — David B Lugo
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). An operating method of a transmitting apparatus in a wireless communication system is provided. The operating method includes detecting an achievable rate region for a receiving apparatus, and determining a modulation and coding scheme (MCS) level and a sliding window superposition coding (SWSC) multi-input multi-output (MIMO) scheme corresponding to the achievable rate region.

8 Claims, 28 Drawing Sheets

(51) Int. Cl.
*H04L 1/00* (2006.01)
*H04L 27/34* (2006.01)
*H04B 7/0456* (2017.01)
*H04B 7/0413* (2017.01)
*H04L 29/08* (2006.01)

(52) U.S. Cl.
CPC .......... *H04L 1/0003* (2013.01); *H04L 1/0009* (2013.01); *H04L 1/0015* (2013.01); *H04L 1/0026* (2013.01); *H04L 27/34* (2013.01); *H04B 7/0413* (2013.01); *H04L 69/323* (2013.01); *H04L 2001/0093* (2013.01)

(58) Field of Classification Search
CPC ... H04L 1/0009; H04L 5/0032; H04L 1/0003; H04L 1/0015; H04L 1/0026; H04L 27/34; H04L 69/323; H04L 2001/0093
See application file for complete search history.

(56) References Cited

U.S. PATENT DOCUMENTS

| | | | | |
|---|---|---|---|---|
| 2010/0014500 | A1* | 1/2010 | Lee | H04L 1/0017 370/342 |
| 2010/0197314 | A1* | 8/2010 | Maaref | H04W 16/04 455/450 |
| 2010/0279729 | A1* | 11/2010 | Hui | H04B 7/024 455/522 |
| 2013/0156139 | A1 | 6/2013 | Lee et al. | |
| 2013/0170366 | A1* | 7/2013 | Prasad | H04W 72/085 370/252 |
| 2015/0188620 | A1* | 7/2015 | Ponnuswamy | H04B 7/10 375/267 |
| 2015/0256244 | A1* | 9/2015 | Yu | H04B 7/0478 375/267 |
| 2016/0285656 | A1 | 9/2016 | Kim et al. | |
| 2017/0294981 | A1* | 10/2017 | Kim | H04J 13/10 |

OTHER PUBLICATIONS

Hieu T. Do et al., 'Linear Beamforming and Superposition Coding With Common Information for the Gaussian MIMO Broadcast Channel', In: IEEE Transactions on Communications, vol. 57, Issue: 8, Aug. 18, 2009.

Ivana Maric et al., 'An Achievable Rate Region for Interference Channels with One Cooperating Transmitter', In: Signals, Systems and Computers, 2007,ACSSC 2007, Conference Record of the Forty-First Asilomar Conference on, Apr. 11, 2008.

S.Vanka et al., 'Superposition Coding Strategies: Design and Experimental Evaluation', In: IEEE Transactions on Wireless Communications, vol. 11, No. 7, May 23, 2012.

* cited by examiner

| block j | 1 | 2 | 3 | ... | b-1 | b |
|---|---|---|---|---|---|---|
| U | 1 | $m_{11}$ | $m_{12}$ | ... | ... | $m_{1,b-1}$ |
| V | $m_{11}$ | $m_{12}$ | ... | ... | $m_{1,b-1}$ | 1 |
| $X_1 = f(U,V)$ | | | | ... | | |
| $X_2$ | $m_{21}$ | $m_{22}$ | ... | ... | $m_{2,b-1}$ | $m_{2b}$ |
| $Y_1$ | $\phi$ | $\hat{m}_{11}$ | $\hat{m}_{12}$ | ... | ... | $\hat{m}_{1,b-1}$ |
| | $\hat{m}_{21}$ | $\hat{m}_{22}$ | ... | ... | $\hat{m}_{2,b-1}$ | $\hat{m}_{2b}$ |
| $Y_2$ | $\phi$ | $\hat{m}_{11}$ | $\hat{m}_{12}$ | ... | ... | $\hat{m}_{1,b-1}$ |
| | $\phi$ | $\hat{m}_{21}$ | $\hat{m}_{22}$ | ... | ... | $\hat{m}_{2,b-1}\hat{m}_{2b}$ |

[1-Stream, 4-Layer, 2-Antennas]

$X_1(1) = T_1 U_1^n(1) + T_2 U_2^n(1) + T_3 U_3^n(1) + T_4 U_4^n(1)$ $X_1(2) = T_1 U_1^n(2) + T_2 U_2^n(2) + T_3 U_3^n(2) + T_4 U_4^n(2)$ blocks ↓

$U_1(m_j) \quad U_2(m_{j-1}) \quad U_3(m_{j-2}) \quad U_4(m_{j-3})$ $$\begin{bmatrix} X_{11} \\ X_{12} \end{bmatrix} = T_1 \begin{bmatrix} u_{11} \\ u_{12} \end{bmatrix} + T_2 [u_2] + T_3 [u_3] + T_4 \begin{bmatrix} u_{41} \\ u_{42} \\ u_{43} \\ u_{44} \end{bmatrix}$$

FIG.13

| form of superposition coding | the number of layers | form of constellation |
|---|---|---|
| BPSK + BPSK + BPSK + BPSK | 4 | 1), 2) |
| 4-PAM + BPSK + BPSK | 3 | 1), 2) |
| 4-QAM + BPSK + BPSK | 3 | 1), 2) |
| 4-PAM + 4-PAM | 2 | 1) |
| 4-PAM + 4-QAM | 2 | 2) |
| 4-QAM + 4-QAM | 2 | 1) |
| 8-PAM + BPSK | 2 | 2) |

APPARATUS AND METHOD FOR TRANSMITTING AND RECEIVING SIGNAL IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 26, 2016 in the Korean Intellectual Property Office and assigned Serial number 10-2016-0009648, and of a Korean patent application filed on Aug. 11, 2016 in the Korean Intellectual Property Office and assigned Serial number 10-2016-0102615, the entire disclosure of each of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Regents of the University of California.

TECHNICAL FIELD

The present disclosure relates to an apparatus and a method for transmitting and receiving a signal in a wireless communication system. More particularly, the present disclosure relates to an apparatus and a method for transmitting and receiving a signal in a wireless communication system using a sliding window superposition coding (SWSC) multi-input multi-output (MIMO) scheme.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A wireless communication system has been developed with various forms for transferring voice and/or data. A typical wireless communication system or network provides various multiplexing schemes, such as a frequency division multiplexing (FDM) scheme, a time division multiplexing (TDM) scheme, a code division multiplexing (CDM) scheme, an orthogonal frequency division multiplexing (OFDM) scheme, and/or the like in order for a user equipment (UE) to access one shared resource. The term UE may be interchangeable with the term mobile station (MS), wireless terminal, mobile device, and/or the like.

Meanwhile, a cellular wireless communication system provides a plurality of base stations (BSs) for a coverage region. Here, the term BS may be interchangeable with the term node B, evolved node B (eNB), evolved universal terrestrial radio access network (E-UTRAN) node B (eNB), access point (AP), and/or the like.

The BSs have unique coverage regions which may partially overlap one another, e.g., cells or sectors and transmit data which a UE may independently receive. A UE may transmit data to a BS which operates a coverage region of the UE or other UE with a similar scheme.

Meanwhile, in the next communication system, a size of a cell becomes smaller due to interference problem among cells, so an interference signal from neighbor cells becomes a main factor which causes to degrade detection efficiency of a desired signal.

Various schemes for interference mitigation have been proposed, and a typical one is an interference-aware successive decoding (IASD) scheme. The IASD scheme has been developed for addressing an issue in a cell edge region in a cellular wireless communication system, and uses a concept of an interference-aware receiver which may successfully decode all of a desired signal and an interference signal. A UE may not control an interference signal, so the IASD scheme requires support by a network.

A network assisted interference cancellation and suppression (NAICS) scheme has been studied in order that a cellular communication system may use the IASD scheme. In the NAICS scheme, signaling and channel estimation information are provided from a network for transmitting an interference signal and a desired signal through the same resource, and decoding or detecting the interference signal.

The IASD scheme may be implemented with a relatively low complexity by preventing simultaneous decoding with a relatively high complexity. However, due to this, performance of the IASD scheme has great difference from Shannon limit known as a theoretical maximum data rate.

Therefore, in a cellular wireless communication system, there is a need for a scheme of preventing degradation of reception performance of cell edge UEs due to interference from a neighbor cell and approaching a theoretical maximum performance of a physical layer in an interference environment.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for transmitting and receiving a signal in a wireless communication system using a sliding window superposition coding (SWSC) multiple input multiple output (MIMO) scheme.

Another aspect of the present disclosure is to provide an apparatus and a method for transmitting and receiving a signal by effectively combining an SWSC MIMO scheme thereby increasing efficiency for signal transmission and reception in a wireless communication system using an SWSC MIMO scheme.

Another aspect of the present disclosure is to provide an apparatus and a method for transmitting and receiving a signal thereby increasing throughput of a plurality of user equipment (UEs) which are located at a cell edge region in a wireless communication system using an SWSC MIMO scheme.

Another aspect of the present disclosure is to provide an apparatus and a method for transmitting and receiving a signal thereby preventing performance degradation due to interference from a neighbor cell in a wireless communication system using an SWSC MIMO scheme.

Another aspect of the present disclosure is to provide an apparatus and a method for transmitting and receiving a signal thereby decreasing complexity in a wireless communication system using an SWSC MIMO scheme.

Another aspect of the present disclosure is to provide an apparatus and a method for transmitting and receiving a signal thereby increasing spectrum efficiency in a wireless communication system using an SWSC MIMO scheme.

Another aspect of the present disclosure is to provide an apparatus and a method for transmitting and receiving a signal based on an achievable data region in a wireless communication system using an SWSC MIMO scheme.

Another aspect of the present disclosure is to provide an apparatus and a method for transmitting and receiving a signal by adaptively applying a modulation scheme in a wireless communication system using an SWSC MIMO scheme.

Another aspect of the present disclosure is to provide an apparatus and a method for transmitting and receiving a signal by adaptively applying a mapping scheme in a wireless communication system using an SWSC MIMO scheme.

Another aspect of the present disclosure is to provide an apparatus and a method for transmitting and receiving a signal by adaptively applying a superposition scheme in a wireless communication system using an SWSC MIMO scheme.

In accordance with an aspect of the present disclosure, an operating method of a transmitting apparatus in a wireless communication system is provided. The operating method includes detecting an achievable rate region for a receiving apparatus, and determining a modulation and coding scheme (MCS) level and a sliding window superposition coding (SWSC) multi-input multi-output (MIMO) scheme corresponding to the achievable rate region, wherein the achievable rate region is determined based on a precoding matrix which is generated based on a channel matrix between each of the transmitting apparatus and other transmitting apparatus and the receiving apparatus.

In accordance with another aspect of the present disclosure, an operating method of a receiving apparatus in a wireless communication system is provided. The operating method includes receiving a signal from a transmitting apparatus, wherein the signal is transmitted by the transmitting apparatus based on an MCS level and an SWSC MIMO scheme corresponding to an achievable rate region for the receiving apparatus, and wherein the achievable rate region is determined based on a precoding matrix which is generated based on a channel matrix between each of the transmitting apparatus and other transmitting apparatus and the receiving apparatus.

In accordance with another aspect of the present disclosure, a transmitting apparatus in a wireless communication system is provided. The transmitting apparatus includes a processor configured to detect an achievable rate region for a receiving apparatus, and to determine a modulation and coding scheme (MCS) level and a sliding window superposition coding (SWSC) multi-input multi-output (MIMO) scheme corresponding to the achievable rate region, wherein the achievable rate region is determined based on a precoding matrix which is generated based on a channel matrix between each of the transmitting apparatus and other transmitting apparatus and the receiving apparatus.

In accordance with another aspect of the present disclosure, a receiving apparatus in a wireless communication system is provided. The receiving apparatus includes a processor configured to receive a signal from a transmitting apparatus, wherein the signal is transmitted by the transmitting apparatus based on a modulation and coding scheme (MCS) level and a sliding window superposition coding (SWSC) multi-input multi-output (MIMO) scheme corresponding to an achievable rate region for the receiving apparatus, and wherein the achievable rate region is determined based on a precoding matrix which is generated based on a channel matrix between each of the transmitting apparatus and other transmitting apparatus and the receiving apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 schematically illustrates a transmitting and receiving operation according to a sliding window superposition coding (SWSC) scheme in a wireless communication system according to an embodiment of the present disclosure;

FIG. 13 schematically illustrates an operating process for an SWSC MIMO scheme in a case that one stream is transmitted in a wireless communication system according to an embodiment of the present disclosure;

Throughout the drawings, it should be noted that like reference numbers are used to depict the same or similar elements, features, and structures.

DETAILED DESCRIPTION

Figure 1:
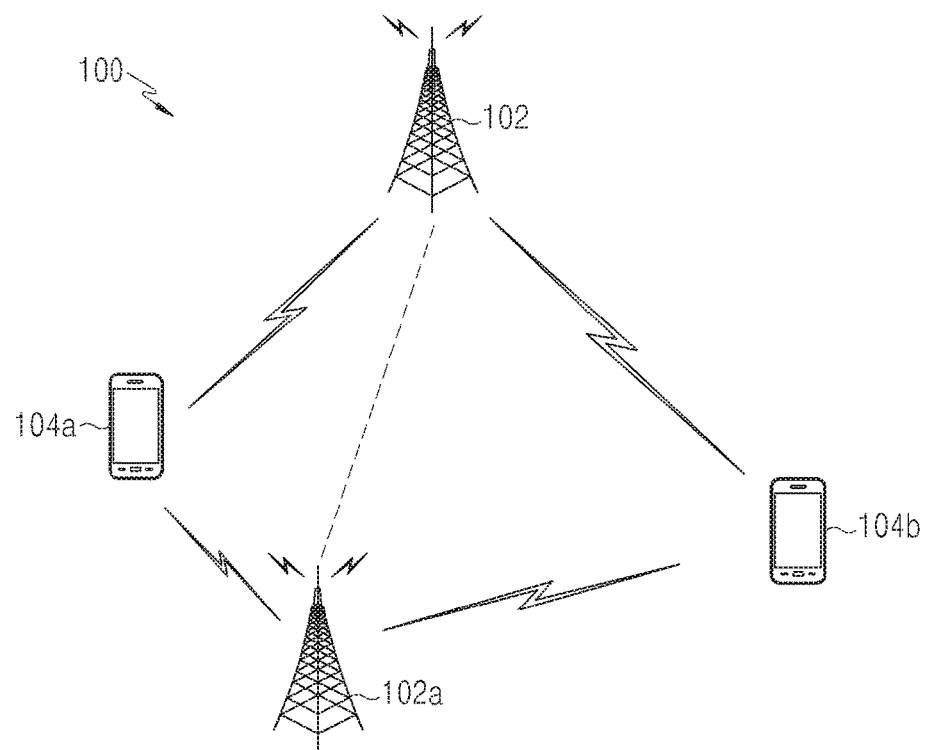
FIG. 1 schematically illustrates a structure of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Before undertaking the detailed description below, it may be advantageous to set forth definitions of certain words and phrases used throughout this patent document: the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Although ordinal numbers, such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the present disclosure. The term "and/or" used herein includes any and all combinations of one or more of the associated listed items.

It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a moving picture experts group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be, for example, a user equipment (UE), and a signal transmitting apparatus may be a base station (BS).

In various embodiments of the present disclosure, it will be noted that the term UE may be interchangeable with the term terminal, mobile station (MS), wireless terminal, mobile device, and/or the like.

In various embodiments of the present disclosure, it will be noted that the term BS may be interchangeable with the term node B, evolved node B (eNB), evolved universal terrestrial radio access network (E-UTRAN) node B, access point (AP), and/or the like.

An embodiment of the present disclosure provides an apparatus and a method for transmitting and receiving a signal in a wireless communication system using a sliding window superposition coding (SWSC) multi-input multi-output (MIMO) scheme. The SWSC MIMO scheme denotes a scheme in which an SWSC scheme and a MIMO scheme are combined according to an embodiment of the present disclosure.

An embodiment of the present disclosure provides an apparatus and a method for transmitting and receiving a signal by effectively combining an SWSC MIMO scheme thereby increasing efficiency for signal transmission and reception in a wireless communication system using an SWSC MIMO scheme.

An embodiment of the present disclosure provides an apparatus and a method for transmitting and receiving a signal thereby increasing throughput of UEs which are located at a cell edge region in a wireless communication system using an SWSC MIMO scheme.

An embodiment of the present disclosure provides an apparatus and a method for transmitting and receiving a signal thereby preventing performance degradation due to interference from a neighbor cell in a wireless communication system using an SWSC MIMO scheme.

An embodiment of the present disclosure provides an apparatus and a method for transmitting and receiving a signal thereby decreasing complexity in a wireless communication system using an SWSC MIMO scheme.

An embodiment of the present disclosure provides an apparatus and a method for transmitting and receiving a signal thereby increasing spectrum efficiency in a wireless communication system using an SWSC MIMO scheme.

An embodiment of the present disclosure provides an apparatus and a method for transmitting and receiving a signal based on an achievable data region in a wireless communication system using an SWSC MIMO scheme.

An embodiment of the present disclosure provides an apparatus and a method for transmitting and receiving a signal by adaptively applying a modulation scheme in a wireless communication system using an SWSC MIMO scheme.

An embodiment of the present disclosure provides an apparatus and a method for transmitting and receiving a signal by adaptively applying a mapping scheme in a wireless communication system using an SWSC MIMO scheme.

An embodiment of the present disclosure provides an apparatus and a method for transmitting and receiving a signal by adaptively applying a superposition scheme in a wireless communication system using an SWSC MIMO scheme.

An apparatus and a method proposed in various embodiments of the present disclosure may be applied to various communication systems, such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a 3$^{rd}$ generation project partnership 2 (3GPP2), a wideband code division multiple access (WCDMA) mobile communication system proposed in the 3GPP2, a CDMA mobile communication system proposed in the 3GPP2, an institute of electrical and electronics engineers (IEEE) 802.16m communication system, an IEEE 802.16e communication system, an evolved packet system (EPS), and a mobile internet protocol (mobile IP) system, a digital video broadcast system, such as a mobile broadcast service, such as a digital multimedia broadcasting (DMB) service, a digital video broadcasting-handheld (DVP-H), an advanced television systems committee-mobile/handheld (ATSC-M/H) service, and the like, and an IPTV, an MPEG media transport (MMT) system and/or the like.

A structure of a wireless communication system according to an embodiment of the present disclosure will be described with reference to FIG. 1.

FIG. 1 schematically illustrates a structure of a wireless communication system according to an embodiment of the present disclosure.

Referring to FIG. 1, a wireless communication system 100 includes one or more than one BSs, e.g., BSs 102 and 102a which may transmit, receive, or exchange a radio signal with one or more than one UEs, e.g., UEs 104a and 104b which are located at a cell or a sector. Each of the BSs 102 and 102a includes a transmission chain and a reception chain, and each of the transmission chain and the reception chain may include a plurality of components related to signal transmission and reception, e.g., a processor, a modulator, a multiplexer, a de-modulator, a de-multiplexer, antennas, and/or the like. Each of the transmission chain and the reception chain may be implemented with one chipset or processor.

For example, each of the UEs 104a and 104b may be a cellular phone, a smart phone, a lap top computer, portable communication devices, portable computing devices, a satellite radio, a GPS device, a PDA, and/or other wireless communication devices.

The BS 102 may communicate with the two UEs 104a at the same time and 104b through one or more than one sub-carriers or carrier components. The BS 102 is configured thereby supporting various types of UEs, such as a UE which is near to the BS 102 (not shown in FIG. 1) or the UEs 104a and 104b which are located at a cell edge region. The UE which is near to the BS 102 is scarcely affected by inter-cell interference. However, the UEs 104a and 104b which are located at the cell edge region may receive a signal transmitted from the BS 102a of a neighbor cell as an interference signal. Similarly, a signal transmitted from the BS 120 to the UE 104a, i.e., a desired signal of the UE 104a may act as an interference signal to the UE 104b, and a signal transmitted from the BS 120 to the UE 104b, i.e., a desired signal of the UE 104b may act as an interference signal to the UE 104a.

A structure of a wireless communication system according to an embodiment of the present disclosure has been described with reference to FIG. 1, and an inner structure of a BS and an inner structure of a UE in a wireless communication system according to an embodiment of the present disclosure will be described with reference to FIG. 2.

Figure 2:
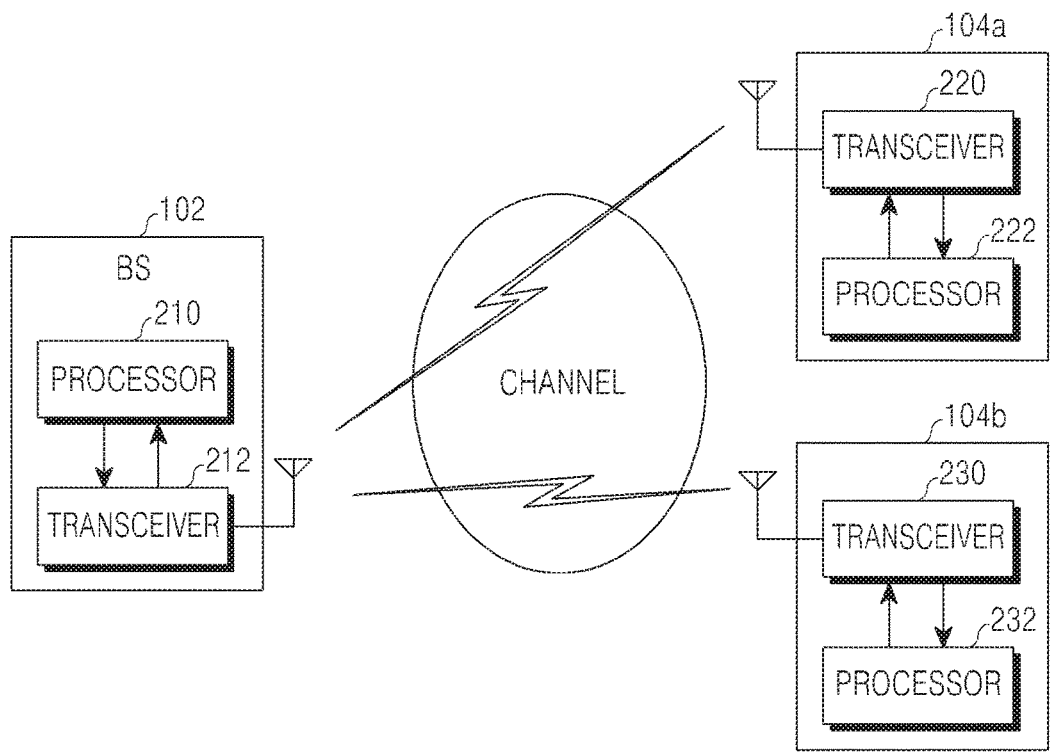
FIG. 2 schematically illustrates an inner structure of a base station (BS) and an inner structure of a user equipment (UE) in a wireless communication system according to an embodiment of the present disclosure.

FIG. 2 schematically illustrates an inner structure of a BS and an inner structure of a UE in a wireless communication system according to an embodiment of the present disclosure.

Referring to FIG. 2, a BS 102 includes a transceiver 212 which may communicate a radio signal with one or more than one UEs, e.g., UEs 104a and 104b through antennas, and a processor 210 which controls a communication by the transceiver 212 and communicates with other BS, e.g., a BS 102s through a backhaul if necessary. The UEs 104a and 104b include transceivers 220 and 230 which may communicate a radio signal with the BS 102 through antennas and processors 222 and 232 which control a communication by the transceivers 220 and 230.

The transceivers 212, 220, and 230 may include communication circuits, such as a radio frequency (RF) processor and a modulator/demodulator (MODEM), and the MODEM may include transmitting elements, such as an encoder, a modulator, a multiplexer, and/or the like, and receiving elements, such as a demultiplexer, a demodulator, a decoder, and/or the like.

If the UEs 104a and 104b are located at a cell edge region which the UEs 104a and 104b may receive an interference signal from a neighbor cell, the UEs 104a and 104b may be determined as a user pair for superposition coding. The BS 102 encodes messages for the UEs 104a and 104b determined as the user pair based on a superposition coding scheme to transmit the encoded messages at the same time, and the UEs 104*a* and 104*b* may classify and recover a desired signal and an interference signal.

Meanwhile, embodiments to be described below operate an SWSC scheme for approaching a theoretical performance limit in a physical layer in a cellular environment when there are cell edge UEs of which performance is degraded due to an interference signal from a neighbor cell(s) in the cellular environment. A system to which the SWSC scheme is applied may include one or more than one transmitters and one or more than one receivers, and may provide better performance to two or more than two transmitters and two or more than two receivers.

Each transmitter transmits messages to be transmitted based on a superposition coding scheme during a preset transmission interval, e.g., a transmission interval including b blocks. At this time, one message is superposed and transmitted during a preset number of continuous blocks. Here, a block denotes a unit resource, e.g., a unit time resource, a unit frequency resource, and/or the like. Each receiver may recover a desired message by performing a decoding procedure on signals which are superposed and received during the preset number of continuous blocks.

An inner structure of a BS and an inner structure of a UE in a wireless communication system according to an embodiment of the present disclosure have been described with reference to FIG. 2, and a transmitting and receiving operation according to an SWSC scheme in a wireless communication system according to an embodiment of the present disclosure will be described with reference to FIG. 3.

FIG. 3 schematically illustrates a transmitting and receiving operation according to an SWSC scheme in a wireless communication system according to an embodiment of the present disclosure.

Referring to FIG. 3, two transmitters and two receivers perform a transmitting and receiving operation according to an SWSC scheme. However, the number of transmitters and the number of receivers which perform the transmitting and receiving operation based on the SWSC scheme are not limited. The number of transmitters and the number of receivers which perform the transmitting and receiving operation based on the SWSC scheme may be varied according to coordination of a network. In FIG. 3, it will be assumed that the same message is transmitted through two blocks and a size of a window is 2. Here, a size of a window denotes the number of blocks included in the window, and a block denotes a unit resource through which data, e.g., a message is transmitted. Here, the unit resource may be a unit time resource, a unit frequency resource, and/or the like.

Firstly, it will be assumed that signals transmitted by two transmitters S1 310 and S2 315 are $X_1$ and $X_2$, respectively, and signals received by receivers R1 320 and R2 325 are $Y_1$ and $Y_2$, respectively. Every block, the transmitter S1 generates a signal $X_1$ by encoding a message to be transmitted according a superposition coding scheme by two codes, e.g., a code U and a code V, and the transmitter S2 generates a signal $X_2$ including a message to be transmitted. For example, each message to be transmitted may be at least one packet or protocol data unit (PDU). For example, each of the code U and the code V may be a turbo code. In FIG. 3, a message to be transmitted is encoded using two codes. However, the message may be encoded using one code and the encoded message may be divided two messages.

In FIG. 3, a message is transmitted through two blocks, and the message is encoded using two codes. However, the number of blocks through which the message is transmitted is not limited. If the number of blocks through which the message is transmitted is b, the message may be encoded using b-1 codes or may be encoded using one code and the encoded message may be divided into b-1 messages.

In a block 1, the transmitter S1 generates a codeword U(1) by encoding a known message (for convenience, illustrated as "1" in FIG. 3) which is known to all of the transmitter S1 and receivers using a code U, generates a codeword V(1) by encoding a message mu which the transmitter S1 intends to transmit based on a code V, and outputs, from an encoder to a next stage, e.g., a modulator, a multiplexer, and/or the like, a codeword $X_1$(1) which is generated by superposition coding the U(1) and V(1), thereby a signal including the codeword $X_1$(1) is transmitted to receivers during the block 1. In the block 1, the transmitter S2 outputs, from an encoder to a next stage, a codeword $X_2$(1) including a message $m_{21}$ which the transmitter S2 intends to transmit, thereby a signal including the message $m_{21}$ is transmitted to receivers.

In a block 2, the transmitter S1 generates a codeword U(2) by encoding a message mu transmitted previously based on the code U, generates a codeword V(2) by encoding a message $m_{22}$ which the transmitter S1 intends to transmit in the block 2 based on the code V, and transmits a codeword $X_1$(2) which is generated by superposition coding the U(2) and V(2). In the block 2, the transmitter S2 transmits a codeword $X_2$(2) including a message $m_{22}$ which the transmitter S2 intends to transmit in the block 2 to receivers.

In this way, messages are transmitted during (b-1) blocks. In a block b as the last block, the transmitter S1 generates a codeword U(b) by encoding a message $m_{1,b-1}$ transmitted previously based on the code U, generates a codeword V(b) by encoding a known message "1" based on the code V, and transmits a codeword $X_1$(b) which is generated by superposition coding the U(b) and V(b). In the block b, the transmitter S2 transmits a codeword $X_2$(b) including a message $m_{2b}$ which the transmitter S2 intends to transmit in the block b.

An example in which two codes, i.e., a code U and a code V are superposed, and a transmitted signal of a transmitter S2 is generated by $X_1$=f(U,V) has been described above, each receiver may perform a sliding window decoding operation using signals received superposed during two blocks. For example, a receiver R1 cancels a codeword U(1) using a known message "1" based on $Y_1$(1) and $Y_1$(2) as received signals in a block 1 and a block 2 and regards V(1) as noise, and detects $X_2$(1) as interference to the receiver R1.

The receiver R1 cancels U(1) from the received signals using a known message "1", cancels the detected signal $X_2$(1), regards V(2) and $X_2$(2) as noise, and detects [V(1) U(2)] as a desired signal. A message $m_{11}$ may be recovered from the detected signal.

Similarly, a received signal $Y_1$(3) of a block 3 is arrived, the receiver R1 may recover a desired message $m_{12}$ by repeating an operation similar to the operation in the block 1 and the block 2 using a codeword U(2) detected previously, not a known message "1". For example, the codeword U(2) is detected in the block 2, so the codeword U(2) is acted as a known message in the block 3.

Similarly, in the next blocks, the receiver R1 may recover desired messages. A received signal $Y_1$(b) of a block b as the last block is arrived, the receiver R1 cancels U(b-1) using a codeword U(b-1) detected previously, cancels V(b) using a known message "1", detects [V(b-1) U(b)] as a desired signal, and recovers a message $m_{1,b-1}$.

The receiver R2 detects a desired signal of the receiver R1 as an interference signal with a scheme similar to a scheme in the receiver R1, cancels the detected interference signal from received signals, and detects a desired signal of the receiver R2.

Upon inputting received signals $Y_2(1)$ and $Y_2(2)$ which are superposed in a block 1 and a block 2, the receiver R2 cancels a codeword U(1) using a known message "1", regards $X_2(1)$, V(2), and $X_2(2)$ as noise, detects [V(1) U(2)] as an interference signal to the receiver R2, and recovers a message $m_{11}$. For convenience, in FIG. 3, the recovered message $m_{11}$ is shown as $\hat{m}_{11}$. In the next stage, the receiver R2 cancels the V(1) detected in the previous block using the message $m_{11}$ from received signals using a known message "1", detects $X_2(1)$, and recovers a message $m_{21}$.

Similarly, in the next blocks, the receiver R2 may recover desired messages. A received signal $Y_1(b)$ is arrived in a block b as the last block, the receiver R2 performs a decoding operation on received signals in the last two blocks using a codeword V(b) detected previously.

For operating an SWSC scheme in a cellular environment, one of transmitters 102 and 102a or a network entity (not shown) may be operated as a coordinator. The coordinator may perform inter-BS co-scheduling operation, determines a user pair to which a superposition coding scheme is applied by considering a capacity region, provides signaling information for an SWSC scheme applied to transmitted packets, and control feedback operation and retransmission operation for SWSC transmission.

Meanwhile, the SWSC scheme as described above considers a case that one antenna is used, i.e., a case that a single input single output (SISO) scheme is used. An embodiment of the present disclosure proposes a scheme of transmitting and receiving a signal by effectively combining a MIMO scheme and the SWSC scheme in a case that a plurality of antennas are used, i.e., in a case that the MIMO scheme is used.

An embodiment of the present disclosure proposes an SWSC MIMO scheme which uses a structure of a sliding-window superposition coding layer of an SWSC scheme in a multi-antenna structure.

An SWSC MIMO scheme according to an embodiment of the present disclosure will be described below.

Firstly, an embodiment of the present disclosure proposes an SWSC MIMO scheme in which all achievable rate regions may be acquired in a case that an SWSC scheme is applied to a multi-antenna network, i.e., a wireless communication system using a MIMO scheme, and the SWSC MIMO scheme includes the following schemes.

(1) A design scheme for a transmitter including an SWSC superposition layer determined as a combination of streams and a quadrature amplitude modulation (QAM) modulation layer per beam.

(2) A design scheme for a transmitter which performs a transmitting operation by adaptively an SWSC MIMO scheme based on an achievable rate region of an SWSC MIMO scheme.

(3) A scheme of operating an SWSC MIMO scheme in a cellular environment.

Secondly, an embodiment of the present disclosure proposes an SWSC scheme which is based on a QAM scheme in a case that the SWSC MIMO scheme is applied to SISO. Further, an embodiment of the present disclosure proposes a design scheme for a QAM-SWSC transmitter which is based on the number of sliding-window superposition coding layers, a form of superposition coding, and a form of constellation.

A structure of a wireless communication system to which a scenario that controls interference among neighbor cells in a cellular downlink wireless channel in which a MIMO scheme is used based on an SWSC MIMO scheme is applied according to an embodiment of the present disclosure will be described with reference to FIG. 4.

Figure 4:
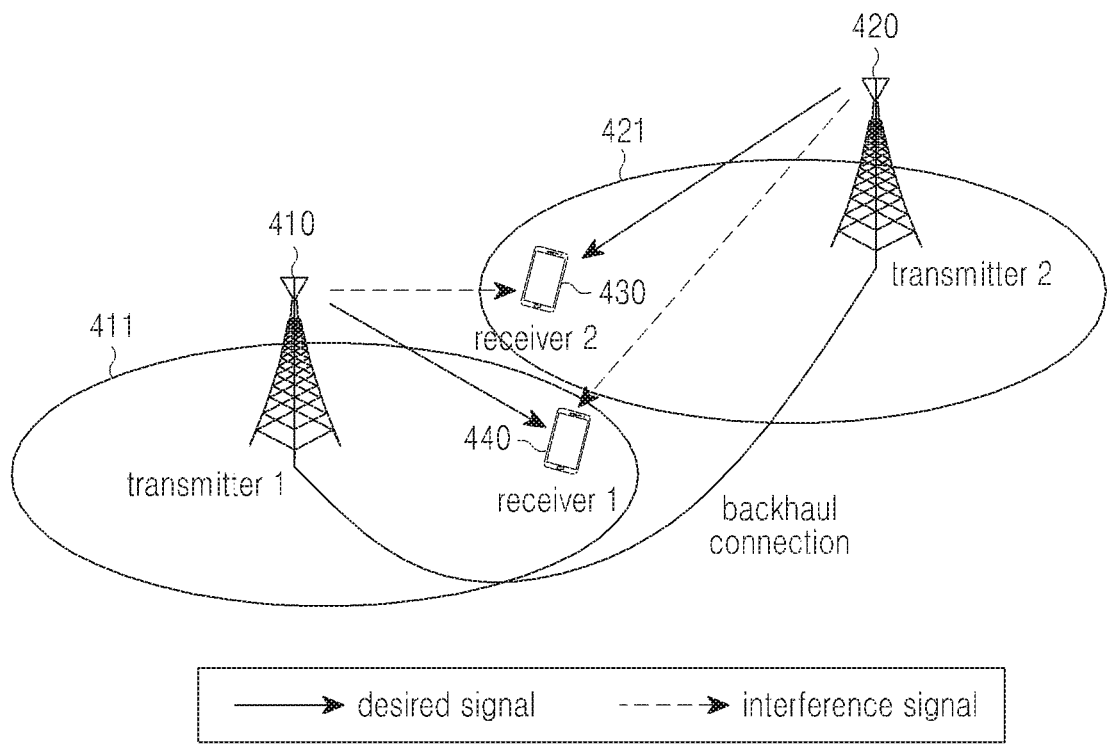
FIG. 4 schematically illustrates a structure of a wireless communication system to which a scenario that controls interference among neighbor cells in a cellular downlink wireless channel in which a multiple input multiple output (MIMO) scheme is used based on an SWSC MIMO scheme is applied according to an embodiment of the present disclosure.

FIG. 4 schematically illustrates a structure of a wireless communication system to which a scenario that controls interference among neighbor cells in a cellular downlink wireless channel in which a MIMO scheme is used based on an SWSC MIMO scheme is applied according to an embodiment of the present disclosure.

Referring to FIG. 4, the wireless communication system includes a plurality of cells, e.g., a cell 411 managed by a BS 410 and a cell 421 managed by a BS 420. A backhaul connection is set up between the BS 410 and the BS 420. Further, there are a UE 430 and a UE 440 in a boundary region between the cell 411 and the cell 421.

A desired signal transmitted from the BS 410 to the UE 430 acts as an interference signal to the UE 440. A desired signal transmitted from the BS 420 to the UE 440 acts as an interference signal to the UE 430.

A structure of a wireless communication system to which a scenario that controls interference among neighbor cells in a cellular downlink wireless channel in which a MIMO scheme is used based on an SWSC MIMO scheme is applied according to an embodiment of the present disclosure has been described with reference to FIG. 4, and a process of operating an SWSC MIMO scheme in a wireless communication system according to an embodiment of the present disclosure will be described with reference to FIG. 5.

Figure 5:
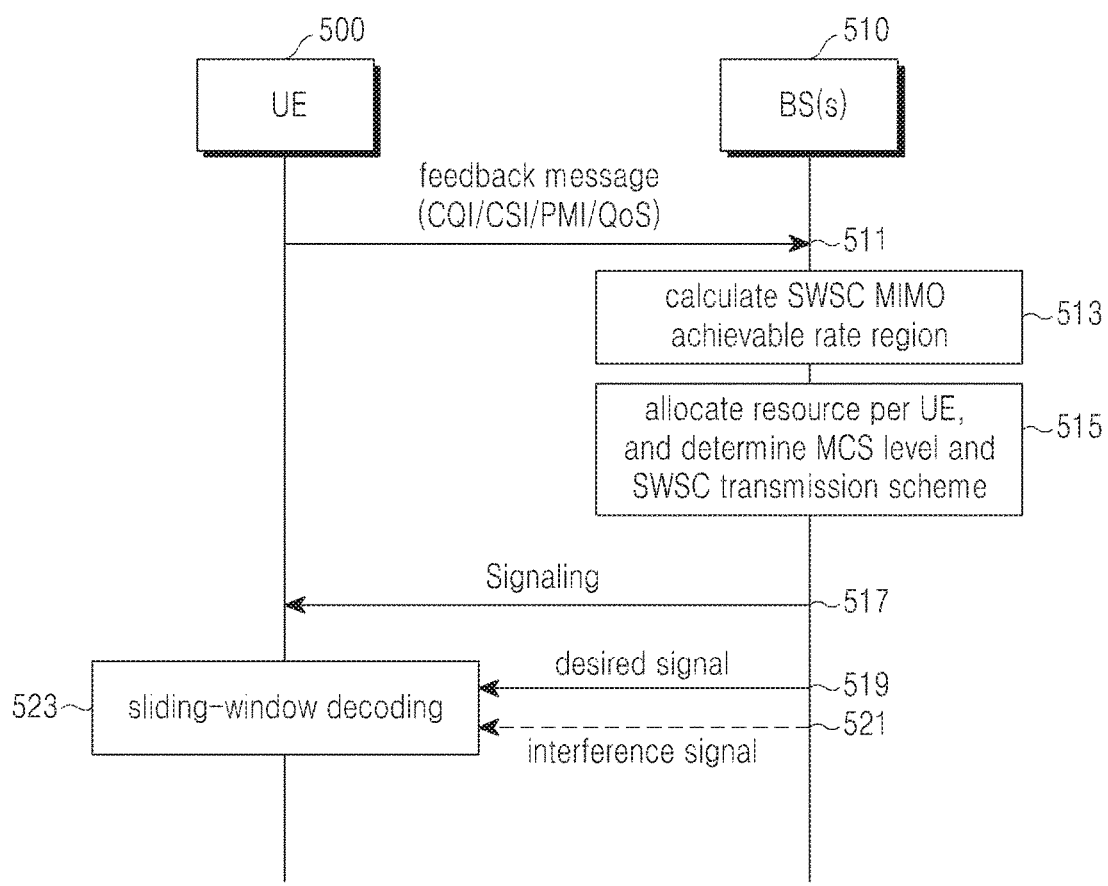
FIG. 5 schematically illustrates a process of operating an SWSC MIMO scheme in a wireless communication system according to an embodiment of the present disclosure.

FIG. 5 schematically illustrates a process of operating an SWSC MIMO scheme in a wireless communication system according to an embodiment of the present disclosure.

Referring to FIG. 5, a UE 500 transmits a feedback message to a BS 510 to which the UE 500 belongs at operation 511. The feedback message is transmitted when a specific event occurs or periodically transmitted. The feedback message includes a channel quality indicator (CQI), channel state information (CSI), a precoding matrix indicator (PMI), a quality of service (QoS), and/or the like. The CQI may be generated based on various parameters, such as a received signal strength indicator (RSSI), received signal code power (RSCP), reference signal received power (RSRP), a reference signal received quality (RSRQ), a carrier-to-interference noise ratio (CINR), a signal-to-noise ratio (SNR), a block error rate (BLER), and/or the like.

After receiving the feedback message from the UE 500, the BS 510 cooperates with other BSs to detect achievable rate regions which the SWSC MIMO may provide at operation 513. For example, the BS 510 and the other BSs may be connected through a backhaul, and the BS 510 may detect the achievable rate regions which the SWSC MIMO may provide under a control of a centralized unit which manages the BS 510 and the other BSs.

The BS 510 allocates a resource to UEs by considering a QoS of the UE 500 in order that a service is provided to the UE 500 through the largest achievable rate region, and determines a modulation and coding scheme (MCS) level and an SWSC MIMO scheme at operation 515. Here, the SWSC MIMO scheme includes at least one of (1) a structure of a sliding-window superposition coding layer, (2) a QAM combination according to a structure of a sliding-window superposition coding layer, (3) a structure of a QAM modulation layer, and (4) a beamforming matrix transferring an SWSC superposition layer signal.

Information related to the MCS level and the SWSC MIMO scheme determined for the UE 500 in the BS 510 is transmitted to the UE 500 at operation 517. The BS 510 transmits a desired signal to the UE 500 based on the determined SWSC MIMO scheme at operation 519. In FIG. 5, the BS 510 is illustrated as one BS, however, the BS 510 may include a plurality of BSs which provide a cooperative communication. Accordingly, if the BS 510 includes the plurality of BSs, a desired signal which does not target the UE 500 and is transmitted to other UEs is received in the UE 500 as an interference signal to the UE 500 at operation 521.

Upon receiving a desired signal and an interference signal at the same time based on the information related to the MCS level and the SWSC MIMO scheme received from the BS 510 through the message, the UE 500 performs a decoding operation based on an adaptive decoding scheme or an iterative soft decoding scheme using a transmission structure of the SWSC scheme similar to an SWSC SISO scheme, and recovers the desired signal at operation 523.

A process of operating an SWSC MIMO scheme in a wireless communication system according to an embodiment of the present disclosure has been described with reference to FIG. 5, and an example of an inner structure of a signal transmitting apparatus to which an SWSC MIMO scheme is applied in a wireless communication system according to an embodiment of the present disclosure will be described with reference to FIG. 6.

Figure 6:
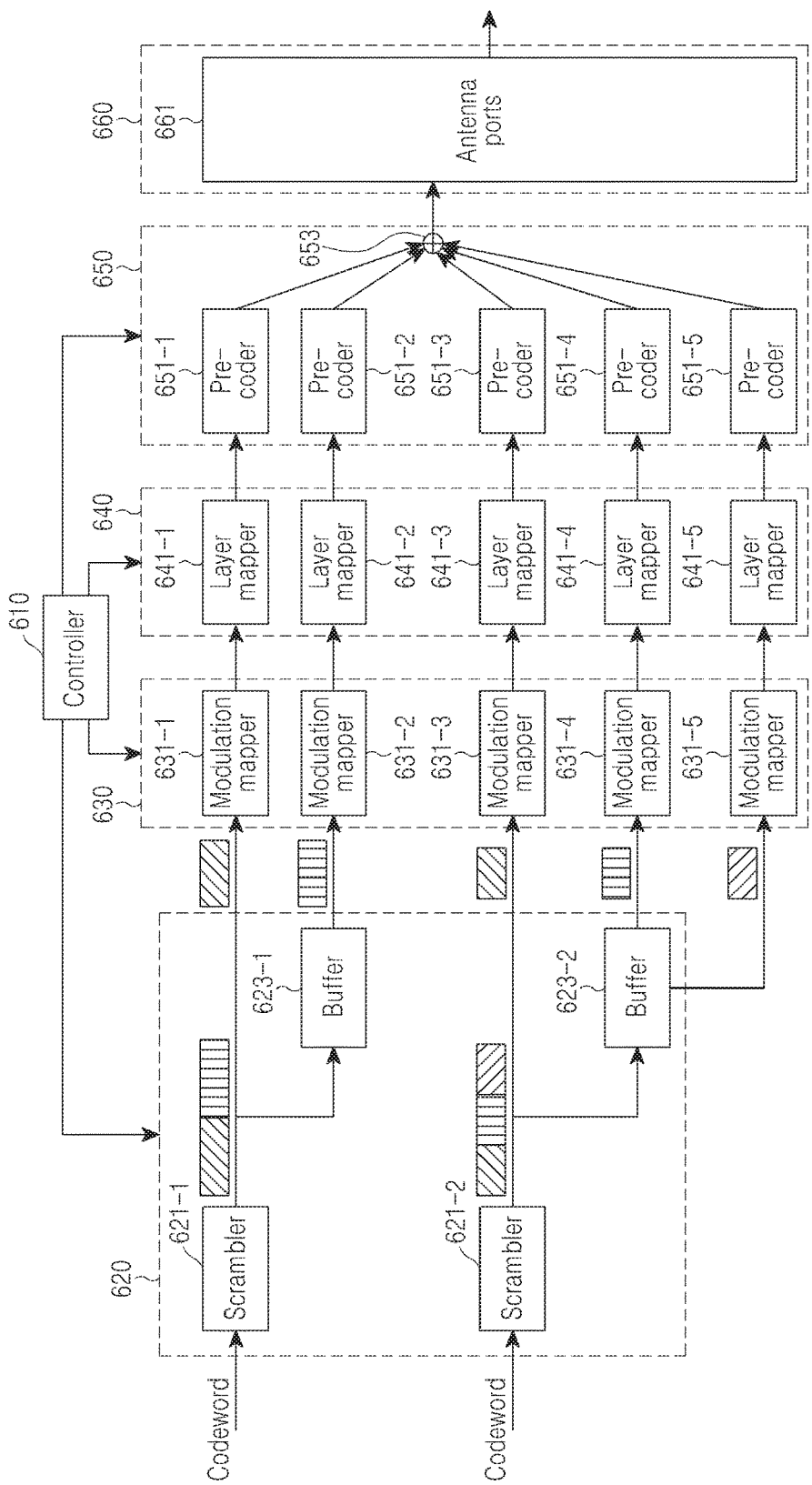
FIG. 6 schematically illustrates an inner structure of a signal transmitting apparatus to which an SWSC MIMO scheme is applied in a wireless communication system according to an embodiment of the present disclosure.

FIG. 6 schematically illustrates an inner structure of a signal transmitting apparatus to which an SWSC MIMO scheme is applied in a wireless communication system according to an embodiment of the present disclosure.

Referring to FIG. 6, a controller 610 determines the number of streams and a structure 620 of a sliding-window superposition coding layer, a QAM combination 630 according to the number of streams and the structure of the sliding-window superposition coding layer, a structure 640 of a QAM modulation layer, and a beamforming matrix 650 transferring each SWSC superposition layer in order to generate a desired achievable rate region based on a CQI, CSI, a PMI, a QoS, and the number of antennas included in a feedback message received from a UE. Here, an operation of determining, by a signal transmitting apparatus 660, e.g., a BS, the number of streams and a structure of a sliding-window superposition coding layer, a QAM combination according to the number of streams and the structure of the sliding-window superposition coding layer, a structure of a QAM modulation layer, and a beamforming matrix transferring each SWSC superposition layer in order to generate a desired achievable rate region based on a CQI, CSI, a PMI, a QoS, and the number of antennas included in a feedback message received from a UE will be described below, and a detailed description thereof will be omitted herein.

As shown in FIG. 6, it will be assumed that the controller 610 determines that the number of streams is 2, two sliding-window superposition coding layer structures are used for one of the two streams, and three sliding-window superposition coding layer structures are used for the other of the two streams in order to generate a desired achievable rate region based on a CQI, CSI, a PMI, a QoS, and the number of antennas included in a feedback message received from a UE.

One of two streams, i.e., two codewords is input to a scrambler 621-1, and the scrambler 621-1 scrambles the codeword based on a preset scrambling scheme to generate a scrambled signal, and the scrambled signal includes two sub-scrambled signals. One of the two sub-scrambled signals is output to a modulation mapper 631-1, and the modulation mapper 631-1 modulates the sub-scrambled signal corresponding to a preset modulation scheme to generate a modulated signal, and outputs the modulated signal to a layer mapper 641-1. The layer mapper 641-1 generates a layer-mapped signal by performing a layer mapping operation corresponding to a preset layer mapping scheme on the modulated signal output from the modulation mapper 631-1, and outputs the layer-mapped signal to a precoder 651-1. The precoder 651-1 generates a precoded signal by performing a precoding operation on the layer-mapped signal output from the layer mapper 641-1 based on a certain precoding scheme, and outputs the precoded signal to an adder 653.

The other one of the two sub-scrambled signals is output to a buffer 623-1. The buffer 623-1 buffers the sub-scrambled signal output from the scrambler 621-1 during preset time and outputs the buffered sub-scrambled signal to a modulation mapper 631-2 at time. The modulation mapper 631-2 generates a modulated signal by modulating the sub-scrambled signal output from the buffer 623-1 corresponding to a preset modulation to output the modulated signal to a layer mapper 641-2. The layer mapper 641-2 generates a layer-mapped signal by performing a layer mapping operation corresponding to a preset layer mapping scheme on the modulated signal output from the modulation mapper 631-2 to output the layer-mapped signal to a precoder 651-2. The precoder 651-2 generates a precoded signal by performing a precoding operation on the layer-mapped signal output from the layer mapper 641-2 based on a certain precoding scheme to output the precoded signal to the adder 653.

The other of the two streams, i.e., the two codewords is input to a scrambler 621-2, and the scrambler 621-2 scrambles the codeword based on a preset scrambling scheme to generate a scrambled signal, and the scrambled signal includes three sub-scrambled signals. One of the three sub-scrambled signals is output to a modulation mapper 631-3, and the modulation mapper 631-3 modulates the sub-scrambled signal corresponding to a preset modulation scheme to generate a modulated signal, and outputs the modulated signal to a layer mapper 641-3. The layer mapper 641-3 generates a layer-mapped signal by performing a layer mapping operation corresponding to a preset layer mapping scheme on the modulated signal output from the modulation mapper 631-3, and outputs the layer-mapped signal to a precoder 651-3. The precoder 651-3 generates a precoded signal by performing a precoding operation on the layer-mapped signal output from the layer mapper 641-3 based on a certain precoding scheme, and outputs the precoded signal to the adder 653.

The others of the three sub-scrambled signals are output to a buffer 623-2. The buffer 623-2 buffers the sub-scrambled signals output from the scrambler 621-2 during preset time and outputs the buffered two sub-scrambled signals to a modulation mapper 631-4 and a modulation mapper 631-5, respectively, at time.

The modulation mapper 631-4 generates a modulated signal by modulating the sub-scrambled signal output from the buffer 623-2 corresponding to a preset modulation to output the modulated signal to a layer mapper 641-4. The layer mapper 641-4 generates a layer-mapped signal by performing a layer mapping operation corresponding to a preset layer mapping scheme on the modulated signal output from the modulation mapper 631-4 to output the layer-mapped signal to a precoder 651-4. The precoder 651-4 generates a precoded signal by performing a precoding operation on the layer-mapped signal output from the layer mapper 641-4 based on a certain precoding scheme to output the precoded signal to the adder 653.

The modulation mapper 631-5 generates a modulated signal by modulating the sub-scrambled signal output from the buffer 623-2 corresponding to a preset modulation to output the modulated signal to a layer mapper 641-5. The layer mapper 641-5 generates a layer-mapped signal by performing a layer mapping operation corresponding to a preset layer mapping scheme on the modulated signal output from the modulation mapper 631-5 to output the layer-mapped signal to a precoder 651-5. The precoder 651-5 generates a precoded signal by performing a precoding operation on the layer-mapped signal output from the layer mapper 641-5 based on a certain precoding scheme to output the precoded signal to the adder 653.

The adder 653 adds the precoded signals output from the precoders 651-1 to 651-5 to output the added signal to antenna ports 661. The antenna ports 661 transmit the signal output from the adder 653 over an air.

While the controller 610, the scrambler 621-1, the scrambler 621-2, the buffer 623-1, the buffer 623-2, the modulation mappers 631-1 to 631-5, the layer mappers 641-1 to 641-5, the precoders 651-1 to 651-5, the adder 653, and the antenna ports 661 are described in the signal transmitting apparatus 660 as separate units, it is to be understood that this is merely for convenience of description. In other words, two or more of the controller 610, the scrambler 621-1, the scrambler 621-2, the buffer 623-1, the buffer 623-2, the modulation mappers 631-1 to 631-5, the layer mappers 641-1 to 641-5, the precoders 651-1 to 651-5, the adder 653, and the antenna ports 661 may be incorporated into a single unit.

The signal transmitting apparatus 660 may be implemented with one processor.

An example of an inner structure of a signal transmitting apparatus to which an SWSC MIMO scheme is applied in a wireless communication system according to an embodiment of the present disclosure has been described with reference to FIG. 6, and an example of a process of transmitting a signal in a signal transmitting apparatus in a case that an SWSC MIMO scheme is applied in a wireless communication system according to an embodiment of the present disclosure will be described with reference to FIG. 7.

Figure 7:
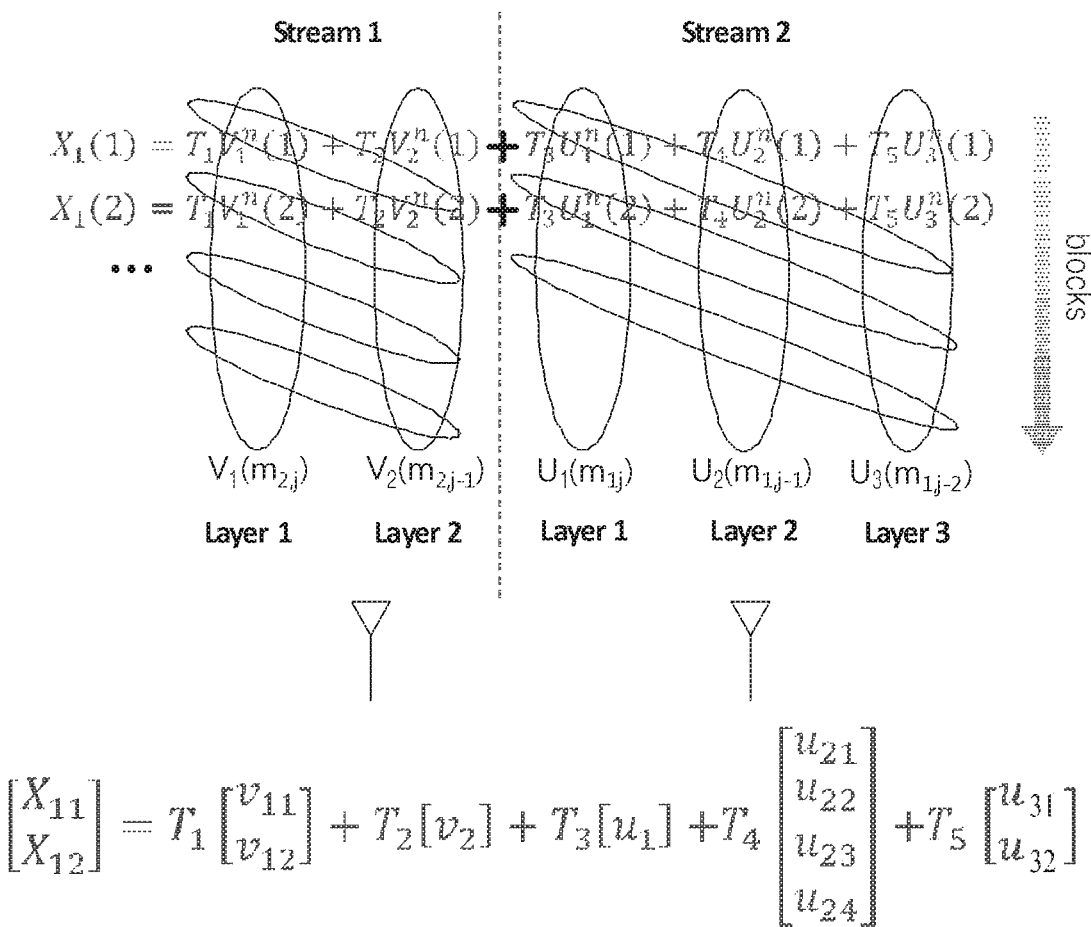
FIG. 7 schematically illustrates a process of transmitting a signal in a signal transmitting apparatus in a case that an SWSC MIMO scheme is applied in a wireless communication system according to an embodiment of the present disclosure.

FIG. 7 schematically illustrates a process of transmitting a signal in a signal transmitting apparatus in a case that an SWSC MIMO scheme is applied in a wireless communication system according to an embodiment of the present disclosure.

Referring to FIG. 7, it will be noted that a process of transmitting a signal in a signal transmitting apparatus is a process of transmitting a signal in a case that the signal transmitting apparatus transmits two streams, sets the number of sliding-window superposition coding layers for one of the two streams to 2, sets the number of sliding-window superposition coding layers for the other of the two streams to 3, and uses two antennas.

As shown in FIG. 7, a signal transmitting apparatus applies two sliding-window superposition coding layers, e.g., a layer 1 and a layer 2 to one of two streams, e.g., a stream 1, and applies three sliding-window superposition coding layers, e.g., a layer 1, a layer 2, and a layer 3 to the other one of the two streams, e.g., a stream 2.

In FIG. 7, $m_{ij}$ denotes a message which a signal transmitting apparatus i intends to transmit in a block j, U denotes a code U used in an SWSC transmission scheme, a V denotes a code V used in the SWSC transmission scheme, $X_j$ denotes a message which the signal transmitting apparatus i transmits, $X_i(j)$ denotes a message which the signal transmitting apparatus i transmits in the block j, $X_{ij}$ denotes a symbol which the signal transmitting apparatus i transmits in an antenna port j, and $T_{ij}$ denotes a precoding matrix for an SWSC layer j used in the signal transmitting apparatus i.

In FIG. 7, a vertical ellipse indicates an SWSC superposition layer which is encoded based on a code U or a code V, and a diagonal ellipse indicates that the same message m is transmitted during two blocks.

The signal transmitting apparatus transmits a signal as expressed in Equation 1.

$$\begin{bmatrix} X_{11} \\ X_{12} \end{bmatrix} = T_1 \begin{bmatrix} v_{11} \\ v_{12} \end{bmatrix} + T_2[v_2] + T_3[u_1] + T_4 \begin{bmatrix} u_{21} \\ u_{22} \\ u_{23} \\ u_{24} \end{bmatrix} + T_5 \begin{bmatrix} u_{31} \\ u_{32} \end{bmatrix} \quad \text{Equation 1}$$

An example of a process of transmitting a signal in a signal transmitting apparatus in a case that an SWSC MIMO scheme is applied in a wireless communication system according to an embodiment of the present disclosure has been described with reference to FIG. 7, and an example of a process of generating a transmitted signal in a signal transmitting apparatus in a case that an SWSC MIMO scheme is applied in a wireless communication system according to an embodiment of the present disclosure will be described with reference to FIG. 8.

Figure 8:
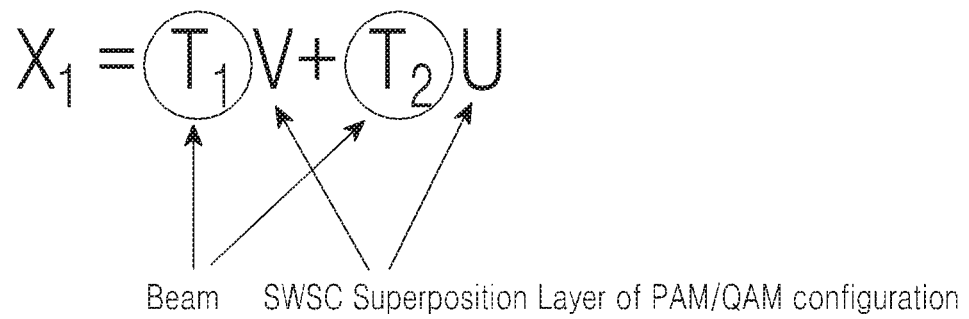
FIG. 8 schematically illustrates a process of generating a transmitted signal in a signal transmitting apparatus in a case that an SWSC MIMO scheme is applied in a wireless communication system according to an embodiment of the present disclosure.

FIG. 8 schematically illustrates a process of generating a transmitted signal in a signal transmitting apparatus in a case that an SWSC MIMO scheme is applied in a wireless communication system according to an embodiment of the present disclosure.

Referring to FIG. 8, in a case that an SWSC MIMO scheme according to an embodiment of the present disclosure is applied, a signal transmitting apparatus transfers an SWSC superposition layer per beam. A signal receiving apparatus performs a symbol-level detection operation based on a linear detection scheme, such as a joint maximum likelihood (ML) detection scheme, a linear minimum mean squared error (LMMSE) detection scheme, and/or the like, and recovers a desired signal by performing an adaptive decoding operation or an iterative soft decoding operation based on a step-superposition coding transmission structure of an SWSC scheme as described in an SWSC MIMO scheme according to an embodiment of the present disclosure.

In FIG. 8, each of $T_1$ and $T_2$ indicates a beamforming matrix transferring an SWSC superposition layer signal, and V and U indicates an SWSC superposition layer signal of pulse amplitude modulation (PAM)/QAM configuration.

An example of a process of generating a transmitted signal in a signal transmitting apparatus in a case that an SWSC MIMO scheme is applied in a wireless communication system according to an embodiment of the present disclosure has been described with reference to FIG. 8. Next, there is a need for an operating scheme which considers a symbol unit and a block unit in an SWSC MIMO scheme according to an embodiment of the present disclosure in order to satisfy a required QoS and acquire the higher spectrum efficiency by considering a theoretical achievable rate region as expressed in Equation 2.

Equation 2

$$R_1 \le \left\{ \begin{array}{c} \log\frac{|I+H_{11}K_{X_1}H_{11}^T+H_{12}K_{X_2}H_{12}^T|}{|I+H_{11}K_V H_{11}^T+H_{12}K_{X_2}H_{12}^T|}+\log|I+H_{11}K_V H_{11}^T|, \\ \log\frac{|J+H_{21}K_{X_1}H_{21}^T+H_{22}K_{X_2}H_{22}^T|}{|I+H_{22}K_{X_2}H_{22}^T|} \end{array} \right\}$$

$$R_2 \le \left\{ \log\frac{|I+H_{11}K_V H_{11}^T+H_{12}K_{X_2}H_{12}^T|}{|I+H_{11}K_V H_{11}^T|}, \log|I+H_{22}K_{X_2}H_{22}^T| \right\}$$

An operating scheme for an SWSC MIMO scheme which considers the symbol unit and the block unit will be described below.

Firstly, an operating scheme for an SWSC MIMO scheme which considers a block unit will be described with reference to FIG. 9.

Figure 9:
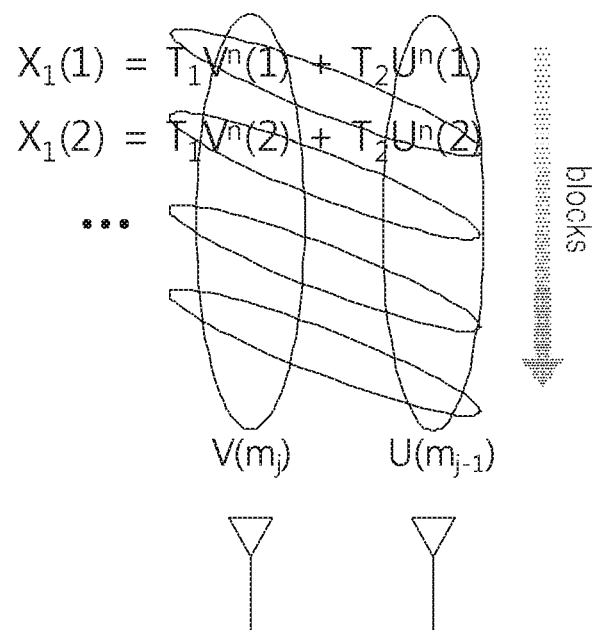
FIG. 9 schematically illustrates an operating process for an SWSC MIMO scheme which considers a block unit in a wireless communication system according to an embodiment of the present disclosure.

FIG. 9 schematically illustrates an operating process for an SWSC MIMO scheme which considers a block unit in a wireless communication system according to an embodiment of the present disclosure.

Referring to FIG. 9, it will be noted that an operating process for an SWSC MIMO scheme which considers a block unit in FIG. 9 is an operating process for an SWSC MIMO scheme which considers a block unit in a case that a single stream is transmitted, and two SWSC superposition layers are configured for the single stream. If a plurality of streams, not the single stream, are transmitted, a signal transmitting apparatus may generate a transmitted signal as described in FIG. 7.

In FIG. 9, a vertical ellipse indicates an SWSC superposition layer which is encoded based on a code U or a code V, and a diagonal ellipse indicates that the same message m is transmitted during two blocks. In FIG. 9, each of $T_1$ and $T_2$ indicates a beamforming matrix transferring an SWSC superposition layer signal.

In FIG. 9, one block includes a plurality of symbols, so an operating process for an SWSC MIMO scheme which considers a block unit in FIG. 9 may be supported by an operating process for an SWSC MIMO scheme which considers a symbol unit in FIG. 10, and this will be described below.

Figure 10:
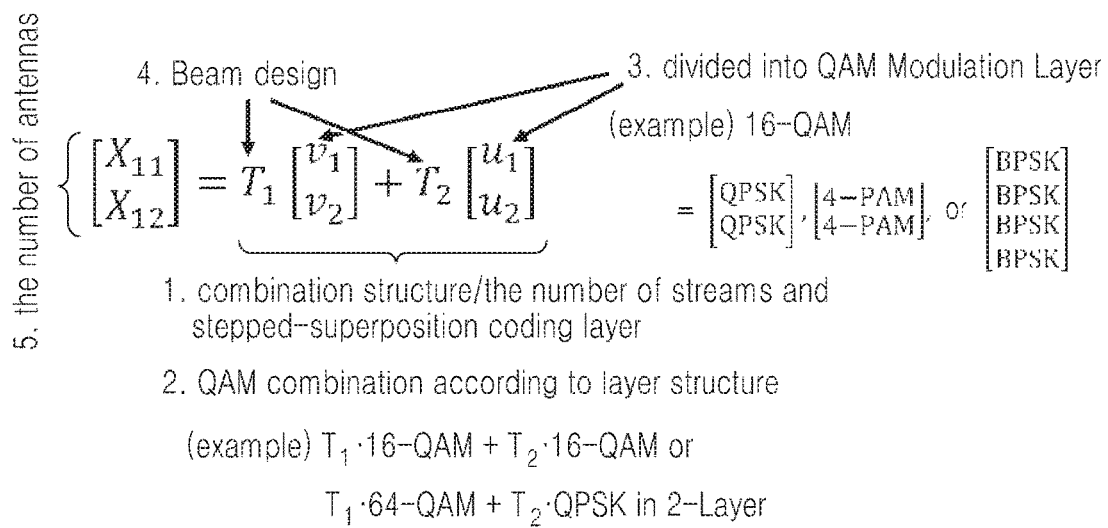
FIG. 10 schematically illustrates an operating process for an SWSC MIMO scheme which considers a symbol unit in a wireless communication system according to an embodiment of the present disclosure.

FIG. 10 schematically illustrates an operating process for an SWSC MIMO scheme which considers a symbol unit in a wireless communication system according to an embodiment of the present disclosure.

Referring to FIG. 10, it will be noted that an operating process for an SWSC MIMO scheme which considers a symbol unit in FIG. 10 is an operating process for an SWSC MIMO scheme which considers a symbol unit in a case that a single stream is transmitted, and two SWSC superposition layers are configured for the single stream. If a plurality of streams, not the single stream, are transmitted, a signal transmitting apparatus may generate a transmitted signal as described in FIG. 7.

Upon determining the number of SWSC superposition layers, for example, upon determining that the number of SWSC superposition layers is 2 in FIG. 10, a signal transmitting apparatus selects a QAM combination according to a structure of the two SWSC superposition layers. The signal transmitting apparatus may select a 16-QAM+16-QAM combination or a 64-QAM+ quadrature phase shift keying (QPSK) combination according to a desired achievable rate region. The signal transmitting apparatus completes a modulation mapping operation by dividing the selected QAM combination into smaller modulation layers.

An operating process for an SWSC MIMO scheme which considers a symbol unit in a wireless communication system according to an embodiment of the present disclosure has been described with reference to FIG. 10, and an example of difference between a structure of a signal transmitting apparatus in a general LTE mobile communication system and a structure of a signal transmitting apparatus in a wireless communication system using an SWSC MIMO scheme according to an embodiment of the present disclosure will be described with reference to FIG. 11.

Figure 11:
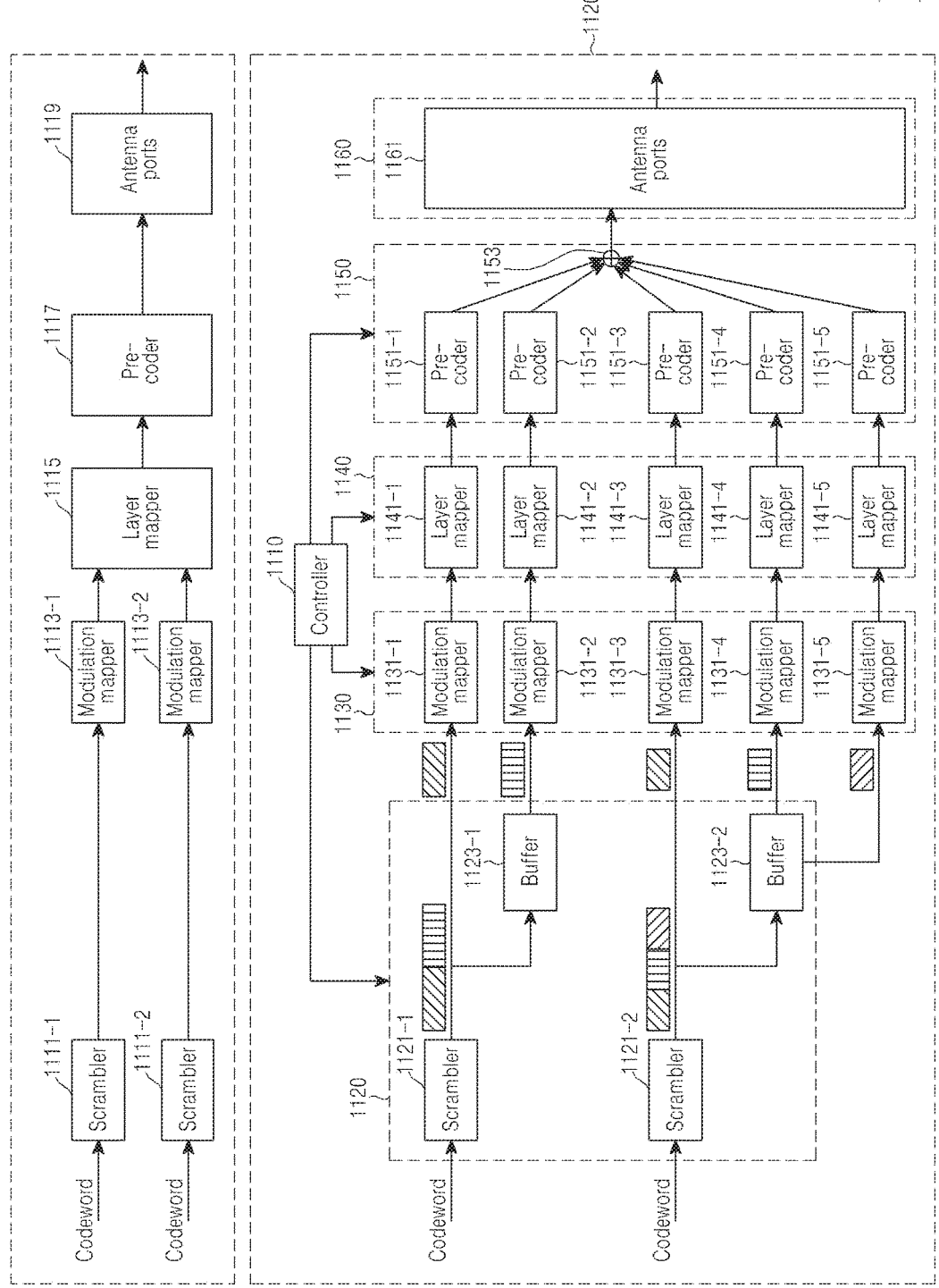
FIG. 11 schematically illustrates a difference between a structure of a signal transmitting apparatus in a general long term evolution (LTE) mobile communication system and a structure of a signal transmitting apparatus in a wireless communication system using an SWSC MIMO scheme according to an embodiment of the present disclosure.

FIG. 11 schematically illustrates a difference between a structure of a signal transmitting apparatus in a general LTE mobile communication system and a structure of a signal transmitting apparatus in a wireless communication system using an SWSC MIMO scheme according to an embodiment of the present disclosure.

Referring to FIG. 11, elements 1120, 1130, 1140, 1150, and 1160 are equivalent to elements 620, 630, 640, 650, and 660 of FIG. 6. Moreover, a signal transmitting apparatus 1120 in a general LTE mobile communication system determines only the number of transmission layers mapped to QAM symbols. This will be described below.

In the signal transmitting apparatus 1120, a plurality of codewords, e.g., two codewords are input to a scrambler 1111-1 and a scrambler 1111-2, respectively. The scrambler 1111-1 scrambles the input codeword based on a preset scrambling scheme to generate a scrambled signal, and outputs the scrambled signal to a modulation mapper 1113-1. The modulation mapper 1113-1 modulates the scrambled signals based on a preset modulation scheme to generate a modulated signal, and outputs the modulated signal to a layer mapper 1115.

The scrambler 1111-2 scrambles the input codeword based on a preset scrambling scheme to generate a scrambled signal, and outputs the scrambled signal to a modulation mapper 1113-2. The modulation mapper 1113-2 modulates the scrambled signals based on a preset modulation scheme to generate a modulated signal, and outputs the modulated signal to the layer mapper 1115.

The layer mapper 1115 performs a layer mapping operation corresponding to a preset layer mapping scheme on the signal output from each of the modulation mapper 1113-1 and the modulation mapper 1113-2 to generate a layer-mapped signal, and outputs the layer-mapped signal to a precoder 1117. The precoder 1117 precodes the signal output from the layer mapper 1115 based on a preset precoding scheme to output the precoded signal to antenna ports 1119. The antenna ports 1119 transmit the signal output from the precoder 1117 over an air.

Alternatively, in a case that an SWSC MIMO scheme according to an embodiment of the present disclosure is sued, a layer mapper included in a signal transmitting apparatus 1120 selects a divided QAM symbol or determines the number of transmission layers mapped to a combined QAM symbol. Here, the layer mapper determines the number of transmission layers mapped to QAM symbols under a control of a controller 1110 included in the signal transmitting apparatus 1120, and the controller 1110 determines the number of transmission layers mapped to the QAM symbols based on a CQI, CSI, and a PMI included in a feedback message received from a UE thereby achieving an optimal achievable rate region. The signal transmitting apparatus 1120 designs a beamforming matrix transferring each SWSC superposition layer signal. The signal transmitting apparatus 1120 performs the operations as described above on a symbol basis.

Specially, in FIG. 11, five layer mappers corresponding to ③, i.e., layer mappers 1141-1 to 1141-5 may be implemented with a single layer mapper. In this case, the single layer mapper may perform the same operation with operations performed in all of the layer mappers 1141-1 to 1141-5, and use signals output from a plurality of SWSC superposition layers as input signals for generating a plurality of output signals to be output to each of five precoders, i.e., precoders 1151-1 to 1151-5.

The controller 1110, the scrambler 1121-1, the scrambler 1121-2, the buffer 1123-1, the buffer 1123-2, the modulation mappers 1131-1 to 1131-5, the layer mappers 1141-1 to 1141-5, the precoders 1151-1 to 1151-5, the adder 1153, and the antenna ports 1161 in FIG. 11 perform the same operation with the controller 610, the scrambler 621-1, the scrambler 621-2, the buffer 623-1, the buffer 623-2, the modulation mappers 631-1 to 631-5, the layer mappers 641-1 to 641-5, the precoders 651-1 to 651-5, the adder 653, and the antenna ports 661 in FIG. 6, respectively, so a detailed description thereof will be omitted herein.

While the controller 1110, the scrambler 1121-1, the scrambler 1121-2, the buffer 1123-1, the buffer 1123-2, the modulation mappers 1131-1 to 1131-5, the layer mappers 1141-1 to 1141-5, the precoders 1151-1 to 1151-5, the adder 1153, and the antenna ports 1161 are described in the signal transmitting apparatus 1120 as separate units, it is to be understood that this is merely for convenience of description. In other words, two or more of the controller 1110, the scrambler 1121-1, the scrambler 1121-2, the buffer 1123-1, the buffer 1123-2, the modulation mappers 1131-1 to 1131-5, the layer mappers 1141-1 to 1141-5, the precoders 1151-1 to 1151-5, the adder 1153, and the antenna ports 1161 may be incorporated into a single unit.

The signal transmitting apparatus 1120 may be implemented with one processor.

An example of difference between a structure of a signal transmitting apparatus in a general LTE mobile communication system and a structure of a signal transmitting apparatus in a wireless communication system using an SWSC MIMO scheme according to an embodiment of the present disclosure has been described with reference to FIG. 11, and an operating process according to an achievable rate region which a wireless communication system using an SWSC MIMO scheme according to an embodiment of the present disclosure intends to achieve will be described below.

Firstly, an example of an operating process for an SWSC MIMO scheme in a case that one stream is transmitted in a wireless communication system according to an embodiment of the present disclosure will be described with reference to FIG. 12.

Figure 12:
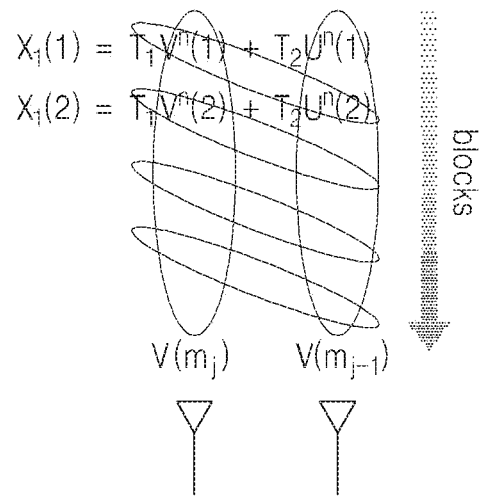
FIG. 12 schematically illustrates an operating process for an SWSC MIMO scheme in a case that one stream is transmitted in a wireless communication system according to an embodiment of the present disclosure.

FIG. 12 schematically illustrates an operating process for an SWSC MIMO scheme in a case that one stream is transmitted in a wireless communication system according to an embodiment of the present disclosure.

Referring to FIG. 12, it will be noted that an operating process for an SWSC MIMO scheme in FIG. 12 is an operating process for an SWSC MIMO scheme in a case that one stream is transmitted, two SWSC superposition layers are configured for the one stream, and two antennas are used.

In FIG. 12 a vertical ellipse, a diagonal ellipse, and definition of each term have been described in FIGS. 7 and 9, and a detailed description thereof will be omitted herein.

An example of an operating process for an SWSC MIMO scheme in a case that one stream is transmitted in a wireless communication system according to an embodiment of the present disclosure has been described with reference to FIG. 12, and another example of an operating process for an SWSC MIMO scheme in a case that one stream is transmitted in a wireless communication system according to an embodiment of the present disclosure will be described with reference to FIG. 13.

FIG. 13 schematically illustrates an operating process for an SWSC MIMO scheme in a case that one stream is transmitted in a wireless communication system according to an embodiment of the present disclosure.

Referring to FIG. 13, it will be noted that an operating process for an SWSC MIMO scheme in FIG. 13 is an operating process for an SWSC MIMO scheme in a case that one stream is transmitted, four SWSC superposition layers are configured for the one stream, and two antennas are used.

In FIG. 13 a vertical ellipse, a diagonal ellipse, and definition of each term have been described in FIGS. 7 and 9, and a detailed description thereof will be omitted herein.

Another example of an operating process for an SWSC MIMO scheme in a case that one stream is transmitted in a wireless communication system according to an embodiment of the present disclosure has been described with reference to FIG. 13, and an example of an operating process for an SWSC MIMO scheme in a case that two streams are transmitted in a wireless communication system according to an embodiment of the present disclosure will be described with reference to FIG. 14.

Figure 14:
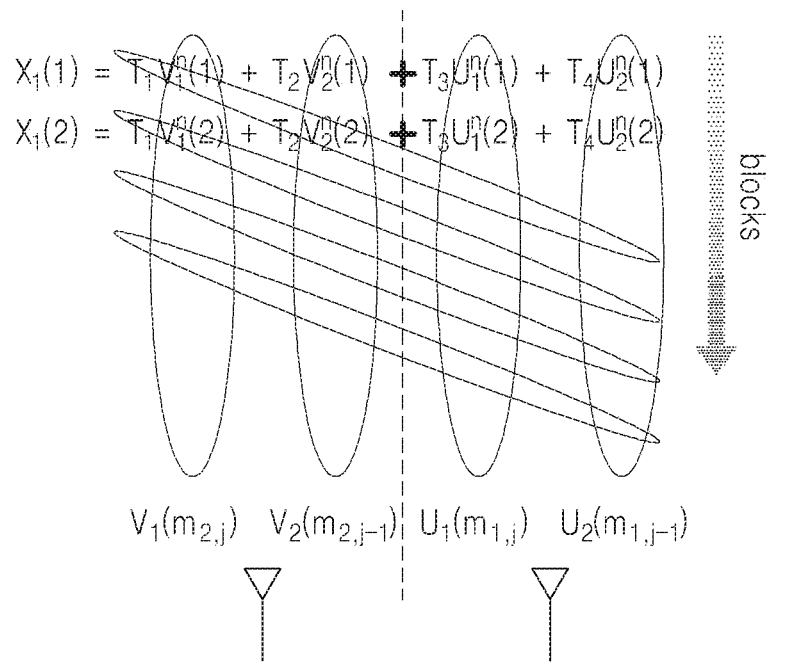
FIG. 14 schematically illustrates an operating process for an SWSC MIMO scheme in a case that two streams are transmitted in a wireless communication system according to an embodiment of the present disclosure.

FIG. 14 schematically illustrates an operating process for an SWSC MIMO scheme in a case that two streams are transmitted in a wireless communication system according to an embodiment of the present disclosure.

Referring to FIG. 14, it will be noted that an operating process for an SWSC MIMO scheme in FIG. 14 is an operating process for an SWSC MIMO scheme in a case that two streams are transmitted, two SWSC superposition layers are configured for each the two streams, and two antennas are used.

In FIG. 14 a vertical ellipse, a diagonal ellipse, and definition of each term have been described in FIGS. 7 and 9, and a detailed description thereof will be omitted herein.

An example of an operating process for an SWSC MIMO scheme in a case that two streams are transmitted in a wireless communication system according to an embodiment of the present disclosure has been described with reference to FIG. 14, and another example of an operating process for an SWSC MIMO scheme in a case that two streams are transmitted in a wireless communication system according to an embodiment of the present disclosure will be described with reference to FIG. 15.

Figure 15:
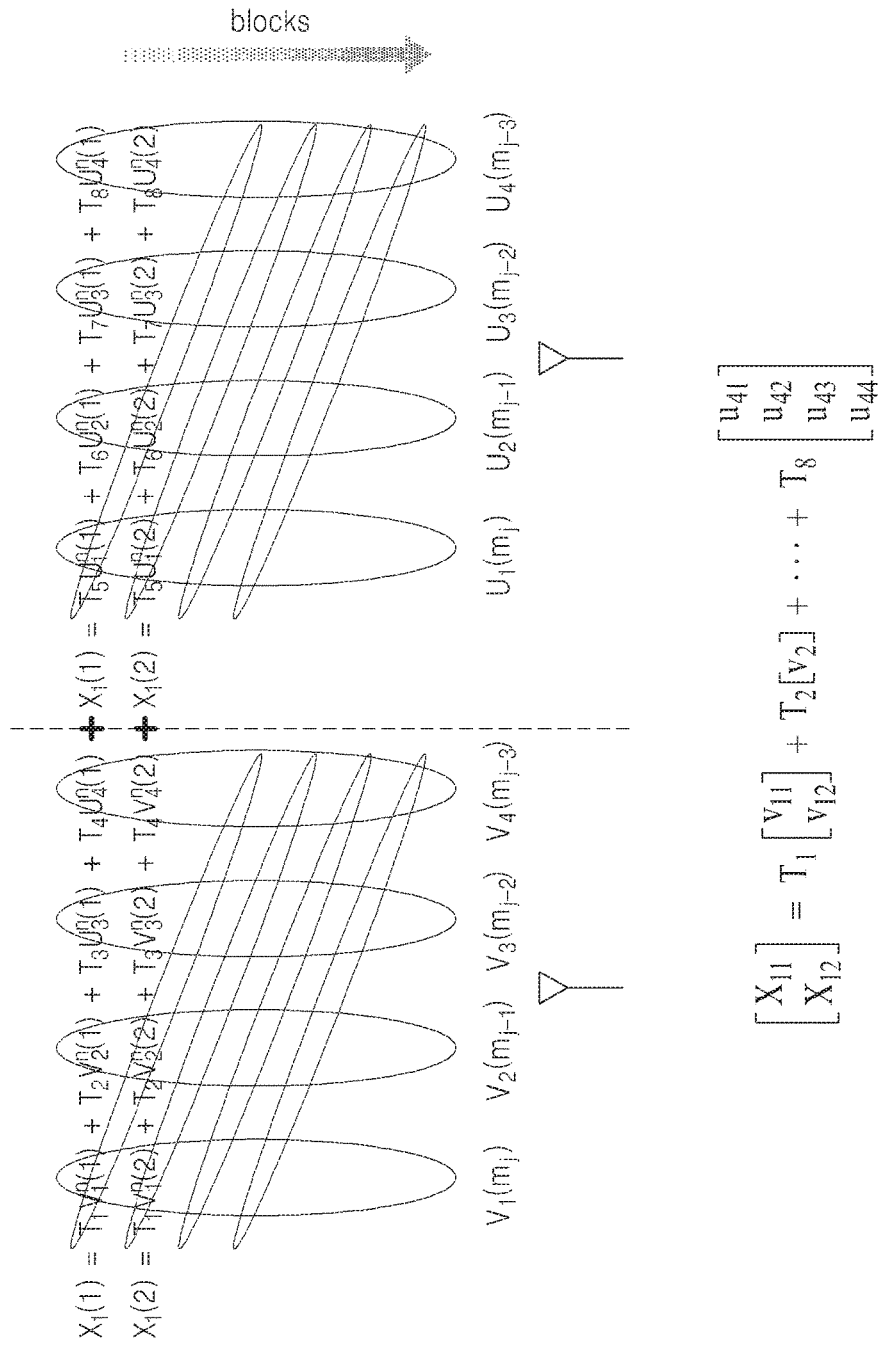
FIG. 15 schematically illustrates an operating process for an SWSC MIMO scheme in a case that two streams are transmitted in a wireless communication system according to an embodiment of the present disclosure.

FIG. 15 schematically illustrates an operating process for an SWSC MIMO scheme in a case that two streams are transmitted in a wireless communication system according to an embodiment of the present disclosure.

Referring to FIG. 15, it will be noted that an operating process for an SWSC MIMO scheme in FIG. 15 is an operating process for an SWSC MIMO scheme in a case that two streams are transmitted, four SWSC superposition layers are configured for each the two streams, and two antennas are used.

In FIG. 15, a vertical ellipse, a diagonal ellipse, and definition of each term have been described in FIGS. 7 and 9, and a detailed description thereof will be omitted herein.

Another example of an operating process for an SWSC MIMO scheme in a case that two streams are transmitted in a wireless communication system according to an embodiment of the present disclosure has been described with reference to FIG. 15, and another example of difference between a structure of a signal transmitting apparatus in a general LTE mobile communication system and a structure of a signal transmitting apparatus in a wireless communication system using an SWSC MIMO scheme according to an embodiment of the present disclosure will be described with reference to FIG. 16.

Figure 16:
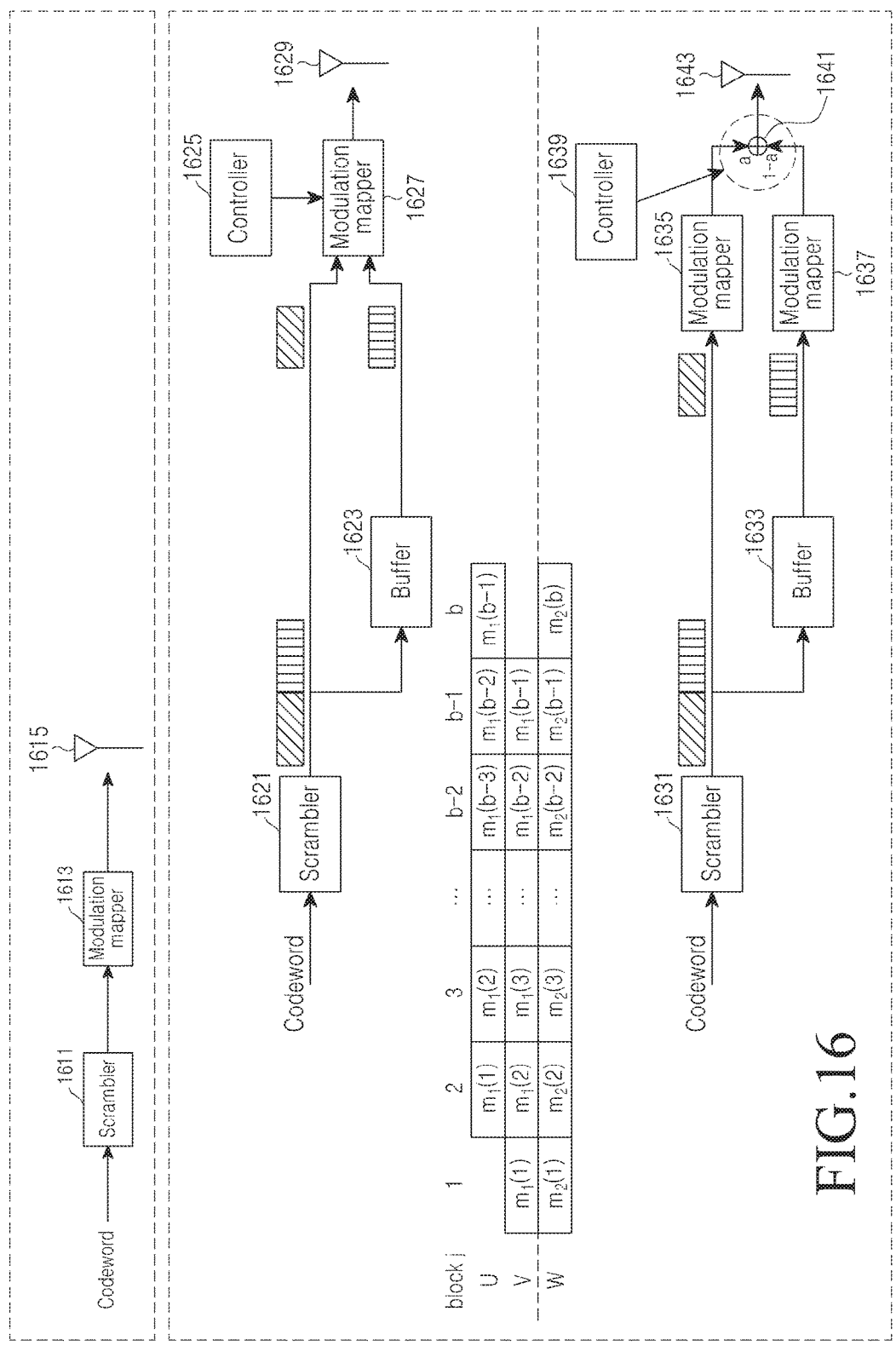
FIG. 16 schematically illustrates a difference between a structure of a signal transmitting apparatus in a general LTE mobile communication system and a structure of a signal transmitting apparatus in a wireless communication system using an SWSC MIMO scheme according to an embodiment of the present disclosure.

FIG. 16 schematically illustrates a difference between a structure of a signal transmitting apparatus in a general LTE mobile communication system and a structure of a signal transmitting apparatus in a wireless communication system using an SWSC MIMO scheme according to an embodiment of the present disclosure.

Referring to FIG. 16, if a single antenna, not a multi-antenna, is applied to an SWSC MIMO scheme according to an embodiment of the present disclosure, the SWSC MIMO scheme according to an embodiment of the present disclosure will be changed to an SWSC scheme which is based on a QAM scheme as shown in FIG. 16.

Firstly, one codeword is input to a scrambler 1611 in a signal transmitting apparatus in a general LTE mobile communication system. The scrambler 1611 scrambles the input codeword based on a preset scrambling scheme to generate a scrambled signal, and outputs the scrambled signal to a modulation mapper 1613. The modulation mapper 1613 modulates the scrambled signals based on a preset modulation scheme to generate a modulated signal, and transmits the modulated signal over an air through an antenna 1615.

In a case that an SWSC MIMO scheme according to an embodiment of the present disclosure is used, an SWSC scheme which is based on a QAM scheme is used if a single antenna, not a multi-antenna, is used, so a codeword is input to scramblers 1621 and 1631.

The scrambler 1621 scrambles the input codeword based on a preset scrambling scheme to generate a scrambled signal, and the scrambled signal includes two sub-scrambled signals. One of the two sub-scrambled signals is output to a modulation mapper 1627, and the other of the two sub-scrambled signals is output to a buffer 1623. The buffer 1623 buffers the sub-scrambled signal during preset time and outputs the buffered sub-scrambled signal to the modulation mapper 1627 at time. The modulation mapper 1627 modulates the signal output from the buffer 1623 based on a preset modulation scheme to generate a modulated signal. Here, the generated modulated signal is transmitted over an air through an antenna 1629. Here, an operation of the modulation mapper 1627 is performed under a control of a controller 1625.

The scrambler 1631 scrambles the input codeword based on a preset scrambling scheme to generate a scrambled signal, and the scrambled signal includes two sub-scrambled signals. One of the two sub-scrambled signals is output to a modulation mapper 1635 and the other of the two sub-scrambled signals is output to a buffer 1633. The buffer 1633 buffers the sub-scrambled signal during preset time and outputs the buffered sub-scrambled signal to a modulation mapper 1637 at time.

The modulation mapper 1635 modulates the sub-scrambled signal based on a preset modulation scheme to generate a modulated signal, and outputs the generated modulated signal to an adder 1641. The modulation mapper 1637 modulates the sub-scrambled signal based on a preset modulation scheme to generate a modulated signal, and outputs the generated modulated signal to the adder 1641. The adder 1641 adds the modulated signal output from the modulation mapper 1635 and adds the modulated signal output from the modulation mapper 1637 to generate an added signal, and the added signal is transmitted over an air through an antenna 1643.

While the scrambler 1621, the buffer 1623, the controller 1625, the modulation mapper 1627, the antenna 1629, the scrambler 1631, the buffer 1633, the modulation mapper 1635, the modulation mapper 1637, the controller 1639, the adder 1641, and the antenna 1643 are described in the signal transmitting apparatus as separate units, it is to be understood that this is merely for convenience of description. In other words, two or more of the scrambler 1621, the buffer 1623, the controller 1625, the modulation mapper 1627, the antenna 1629, the scrambler 1631, the buffer 1633, the modulation mapper 1635, the modulation mapper 1637, the controller 1639, the adder 1641, and the antenna 1643 may be incorporated into a single unit.

The signal transmitting apparatus may be implemented with one processor.

Another example of difference between a structure of a signal transmitting apparatus in a general LTE mobile communication system and a structure of a signal transmitting apparatus in a wireless communication system using an SWSC MIMO scheme according to an embodiment of the present disclosure has been described with reference to FIG. 16, and a superposition coding list of a signal transmitting apparatus in a wireless communication system using an SWSC SISO/MIMO scheme according to an embodiment of the present disclosure will be described with reference to FIG. 17.

Figure 17:
FIG. 17 schematically illustrates a superposition coding list of a signal transmitting apparatus in a wireless communication system using an SWSC SISO/MIMO scheme according to an embodiment of the present disclosure.

FIG. 17 schematically illustrates a superposition coding list of a signal transmitting apparatus in a wireless communication system using an SWSC SISO/MIMO scheme according to an embodiment of the present disclosure.

Referring to FIG. 17, the number of sliding-window superposition coding layers, a form of superposition coding, and a form of constellation need to be considered when a signal transmitting apparatus using a QAM-SWSC scheme is designed. For example, if a 2-layer QAM-SWSC scheme with 16-QAM/16-QAM is used, a superposition coding list of a signal transmitting apparatus in FIG. 17 may be generated.

A superposition coding list of a signal transmitting apparatus in a wireless communication system using an SWSC SISO/MIMO scheme according to an embodiment of the present disclosure has been described with reference to FIG. 17, and an achievable rate region used in a wireless communication system using an SWSC MIMO scheme according to an embodiment of the present disclosure will be described below.

The reason why the number of sliding-window superposition coding layers, a form of superposition coding, and a form of constellation need to be considered when a signal transmitting apparatus using a QAM-SWSC scheme is designed is that a QAM-SWSC achievable rate region is generated by the number of sliding-window superposition coding layers, the form of superposition coding, and the form of constellation. Accordingly, a signal transmitting apparatus facilitates an adaptive QAM-SWSC scheme based on a closed-loop by supporting variable achievable rate regions.

An example of an achievable rate region in a wireless communication system using an SWSC SISO/MIMO scheme which is based on a QAM scheme according to an embodiment of the present disclosure will be described with reference to FIG. 18.

Figure 18:
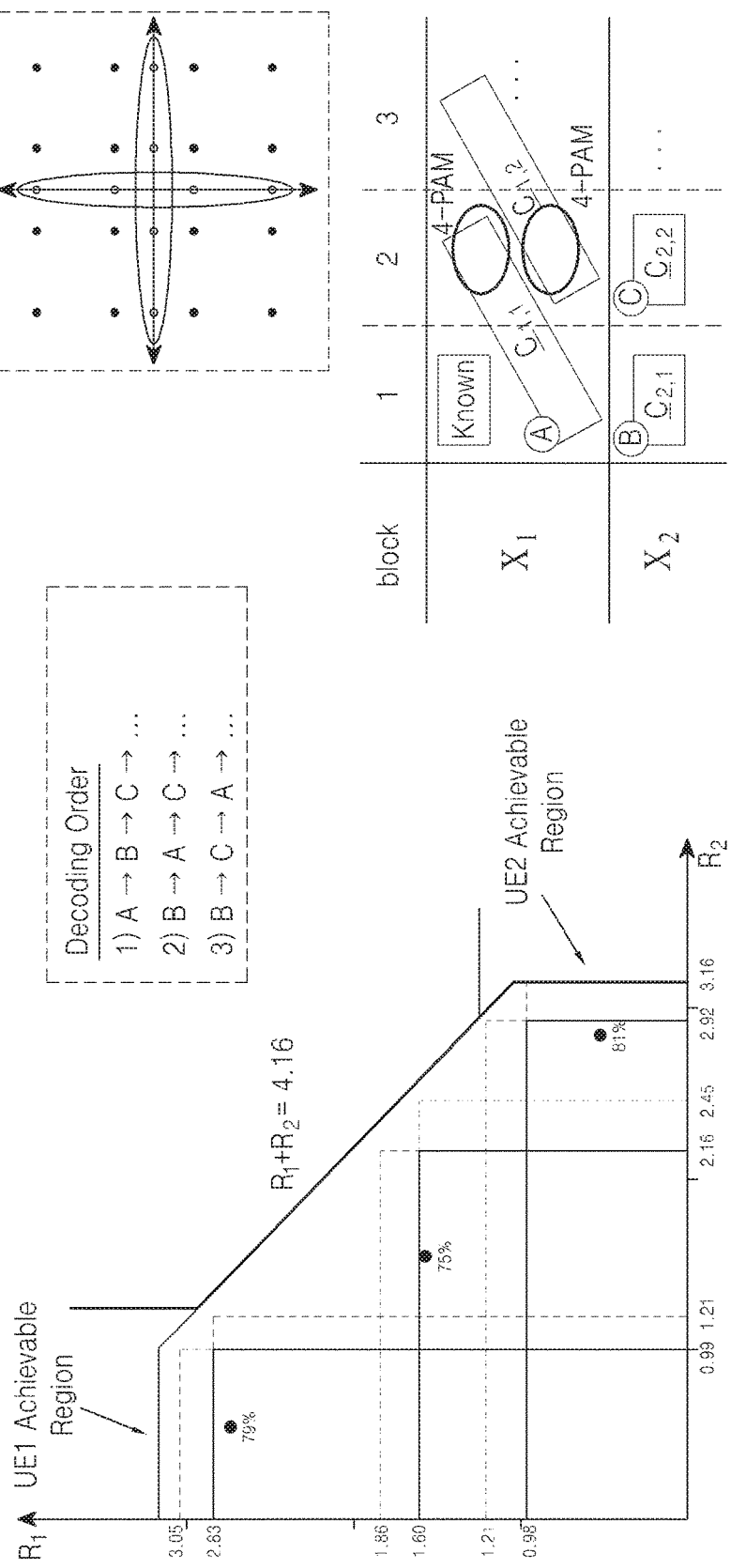
FIG. 18 schematically illustrates an achievable rate region in a wireless communication system using an SWSC single input single output (SISO)/MIMO scheme which is based on a quadrature amplitude modulation (QAM) scheme according to an embodiment of the present disclosure.

FIG. 18 schematically illustrates an achievable rate region in a wireless communication system using an SWSC SISO/

MIMO scheme which is based on a QAM scheme according to an embodiment of the present disclosure.

Referring to FIG. 18, an achievable rate region in FIG. 18 is an achievable rate region in a symmetric additive white Gaussian noise (AWGN) interference channel of SNR=10 dB and SIR=1 dB in a case that each SWSC superposition layer signal is combined based on a 4-PAM+4-PAM scheme and the combined signal is transmitted based on a 16-QAM scheme.

An example of an achievable rate region in a wireless communication system using an SWSC SISO/MIMO scheme which is based on a QAM scheme according to an embodiment of the present disclosure has been described with reference to FIG. 18, and another example of an achievable rate region in a wireless communication system using an SWSC SISO/MIMO scheme which is based on a QAM scheme according to an embodiment of the present disclosure will be described with reference to FIG. 19.

Figure 19:
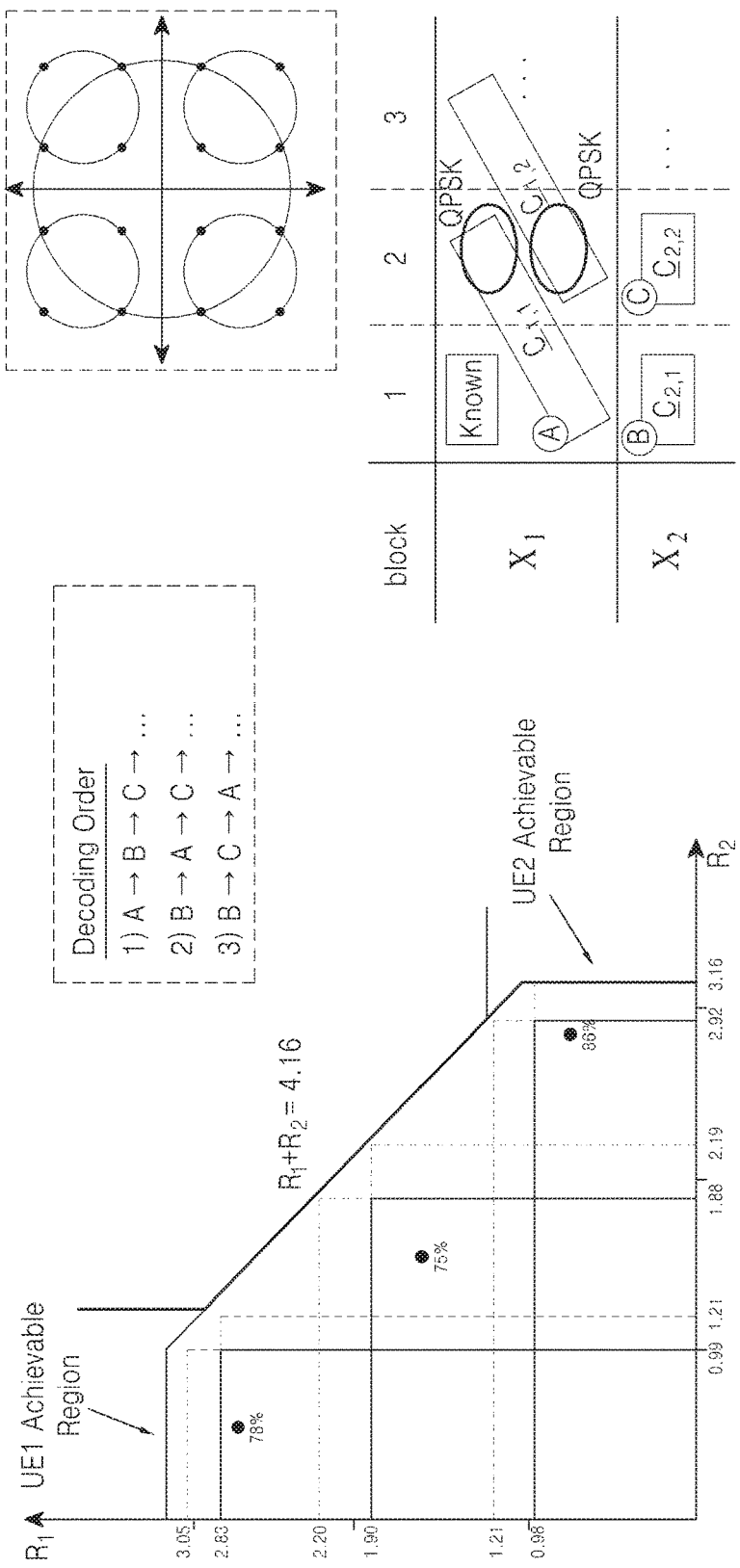
FIG. 19 schematically illustrates an achievable rate region in a wireless communication system using an SWSC SISO/MIMO scheme which is based on a QAM scheme according to an embodiment of the present disclosure.

FIG. 19 schematically illustrates an achievable rate region in a wireless communication system using an SWSC SISO/MIMO scheme which is based on a QAM scheme according to an embodiment of the present disclosure.

Referring to FIG. 19, in a case that each SWSC superposition layer signal is modulated based on a QPSK+QPSK scheme by changing a form of superposition coding even though an SWSC scheme using the same uniform 16-QAM scheme is used, an achievable rate region different from an achievable rate region shown in FIG. 18 may be achieved. Further, it will be noted that an achievable rate region in FIG. 19 is an achievable rate region in a case that the number of SWSC superposition layers is equal to the number of SWSC superposition layers in FIG. 18 and a constellation is a uniform constellation which is identical to a constellation in FIG. 18.

Another example of an achievable rate region in a wireless communication system using an SWSC SISO/MIMO scheme which is based on a QAM scheme according to an embodiment of the present disclosure has been described with reference to FIG. 19, and still another example of an achievable rate region in a wireless communication system using an SWSC SISO/MIMO scheme which is based on a QAM scheme according to an embodiment of the present disclosure will be described with reference to FIG. 20.

Figure 20:
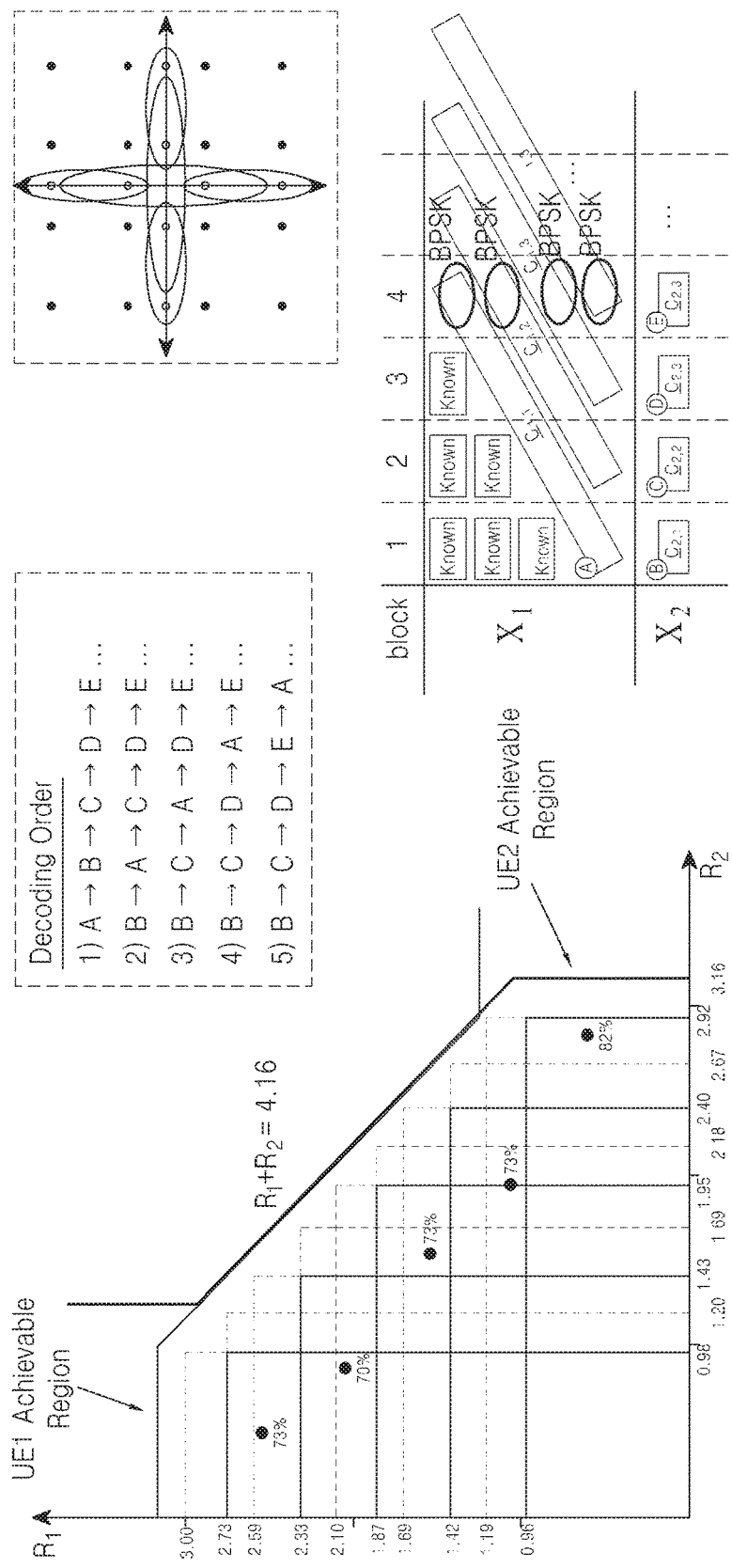
FIG. 20 schematically illustrates an achievable rate region in a wireless communication system using an SWSC SISO/MIMO scheme which is based on a QAM scheme according to an embodiment of the present disclosure.

FIG. 20 schematically illustrates an achievable rate region in a wireless communication system using an SWSC SISO/MIMO scheme which is based on a QAM scheme according to an embodiment of the present disclosure.

Referring to FIG. 20, in a case that each SWSC superposition layer signal is modulated based on a binary phase shift keying (BPSK)+BPSK+BPSK+BPSK scheme by changing the number of SWSC superposition layers even though an SWSC scheme using the same uniform 16-QAM scheme is used, an achievable rate region different from an achievable rate region shown in FIGS. 18 and 19 may be achieved. Further, it will be noted that an achievable rate region in FIG. 20 is an achievable rate region in a case that a constellation is a uniform constellation which is identical to a constellation in FIG. 18.

As shown in FIG. 20, if the number of SWSC superposition layers is increased, an achievable rate region which covers a region larger than an achievable rate region in FIG. 18 may be achieved.

Still another example of an achievable rate region in a wireless communication system using an SWSC SISO/MIMO scheme which is based on a QAM scheme according to an embodiment of the present disclosure has been described with reference to FIG. 20, and another example of an inner structure of a signal transmitting apparatus to which an SWSC MIMO scheme is applied in a wireless communication system according to an embodiment of the present disclosure will be described with reference to FIG. 21.

Figure 21:
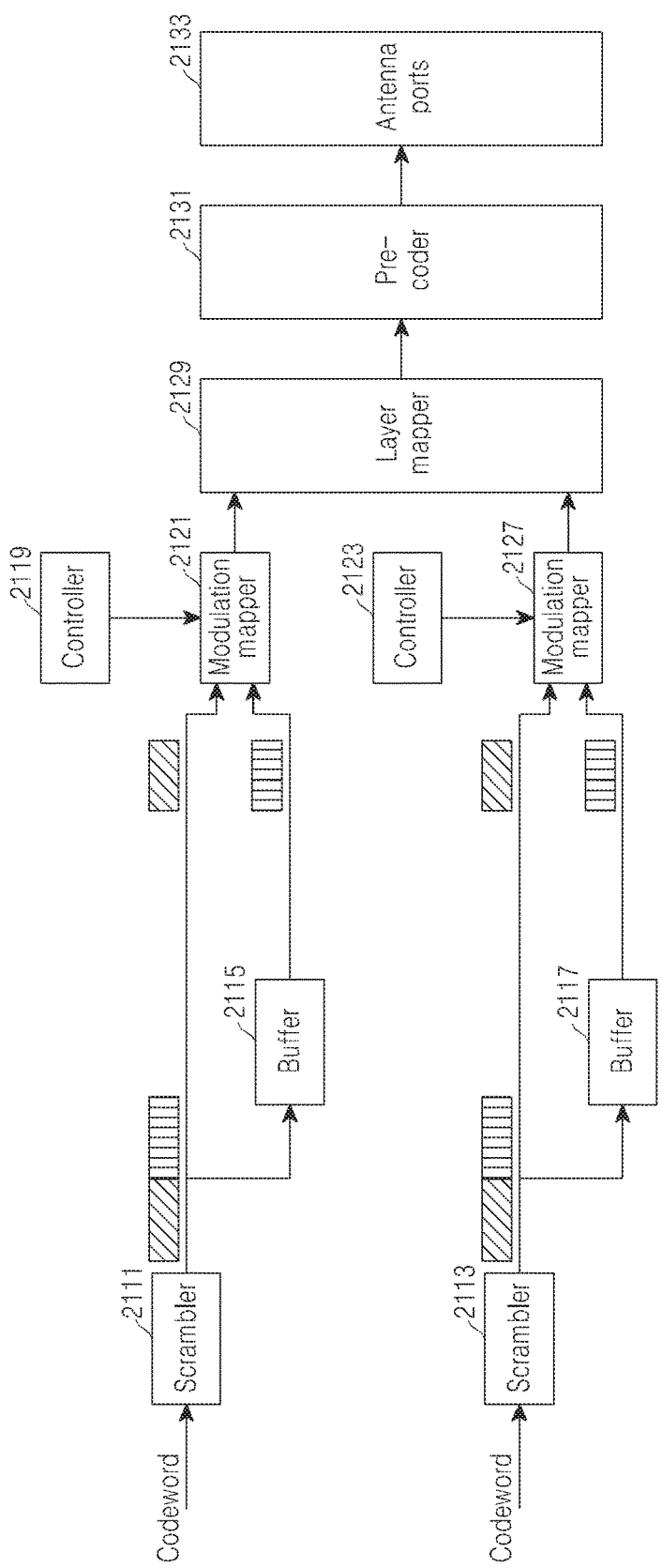
FIG. 21 schematically illustrates an inner structure of a signal transmitting apparatus to which an SWSC MIMO scheme is applied in a wireless communication system according to an embodiment of the present disclosure.

FIG. 21 schematically illustrates an inner structure of a signal transmitting apparatus to which an SWSC MIMO scheme is applied in a wireless communication system according to an embodiment of the present disclosure.

Referring to FIG. 21, it will be noted that an inner structure of a signal transmitting apparatus in FIG. 21 is a structure in which a signal generated through an SWSC scheme is connected to a layer mapper and a precoder in series to be mapped to a multi-antenna.

In the signal transmitting apparatus, a plurality of codewords, e.g., two codewords are input to a scrambler 2111 and a scrambler 2113, respectively. The scrambler 2111 scrambles the input codeword based on a preset scrambling scheme to generate a scrambled signal, and the scrambled signal includes two sub-scrambled signals. One of the two sub-scrambled signals is output to a modulation mapper 2121, and the other of the two sub-scrambled signals is output to a buffer 2115. The buffer 2115 buffers the sub-scrambled signal output from the scrambler 2111 during preset time and outputs the buffered sub-scrambled signal to the modulation mapper 2121 at time. The modulation mapper 2121 modulates the input sub-scrambled signals corresponding to a preset modulation scheme to generate a modulated signal, and outputs the modulated signal to a layer mapper 2129. Here, an operation of the modulation mapper 2121 is performed under a control of a controller 2119.

The scrambler 2113 scrambles the input codeword based on a preset scrambling scheme to generate a scrambled signal, and the scrambled signal includes two sub-scrambled signals. One of the two sub-scrambled signals is output to a modulation mapper 2127 and the other of the two sub-scrambled signals is output to a buffer 2117. The buffer 2117 buffers the sub-scrambled signal output from the scrambler 2113 during preset time and outputs the buffered sub-scrambled signal to the modulation mapper 2127 at time. The modulation mapper 2127 modulates the input sub-scrambled signals corresponding to a preset modulation scheme to generate a modulated signal, and outputs the modulated signal to the layer mapper 2129. Here, an operation of the modulation mapper 2127 is performed under a control of a controller 2123.

The layer mapper 2129 layer-maps the signal output from the modulation mapper 2121 and the signal output from the modulation mapper 2127 corresponding to a preset layer mapping scheme to generate a layer-mapped signal, and outputs the layer-mapped signal to a precoder 2131. The precoder 2131 precodes the layer-mapped signal output from the layer mapper 2129 based on a preset precoding scheme to output the precoded signal to antenna ports 2133. The antenna ports 2133 transmit the signal output from the precoder 2131 over an air.

While the scrambler 2111, the scrambler 2113, the buffer 2115, the buffer 2117, the controller 2119, the modulation mapper 2121, the controller 2123, the modulator 2127, the layer mapper 2129, the precoder 2131, and the antenna ports 2133 are described in the signal transmitting apparatus as separate units, it is to be understood that this is merely for convenience of description. In other words, two or more of the scrambler 2111, the scrambler 2113, the buffer 2115, the buffer 2117, the controller 2119, the modulation mapper 2121, the controller 2123, the modulator 2127, the layer mapper 2129, the precoder 2131, and the antenna ports 2133 may be incorporated into a single unit.

Another example of an inner structure of a signal transmitting apparatus to which an SWSC MIMO scheme is applied in a wireless communication system according to an embodiment of the present disclosure has been described with reference to FIG. 21, and still another example of an inner structure of a signal transmitting apparatus to which an SWSC MIMO scheme is applied in a wireless communication system according to an embodiment of the present disclosure will be described with reference to FIG. 22.

Figure 22:
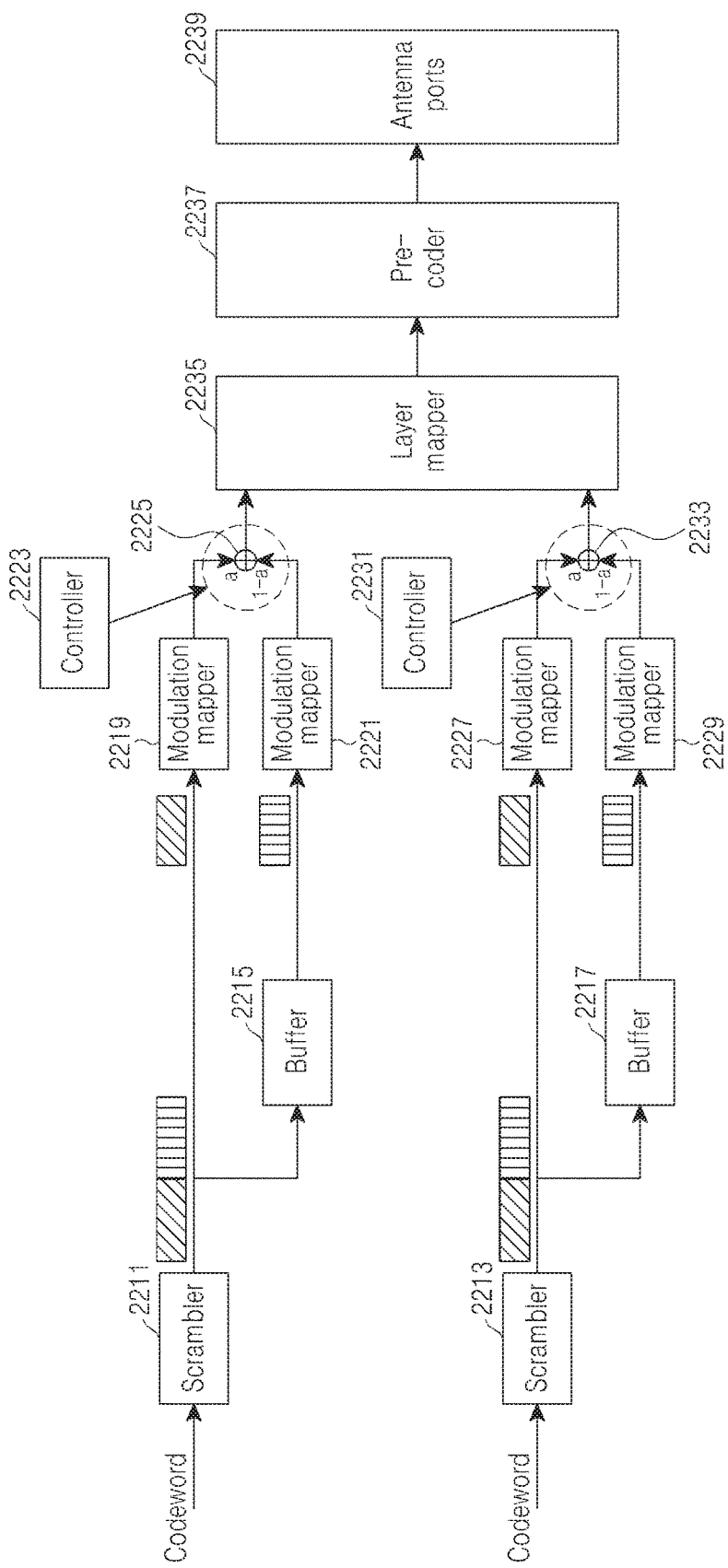
FIG. 22 schematically illustrates an inner structure of a signal transmitting apparatus to which an SWSC MIMO scheme is applied in a wireless communication system according to an embodiment of the present disclosure.

FIG. 22 schematically illustrates an inner structure of a signal transmitting apparatus to which an SWSC MIMO scheme is applied in a wireless communication system according to an embodiment of the present disclosure.

Referring to FIG. 22, it will be noted that an inner structure of a signal transmitting apparatus in FIG. 22 is a structure in which a signal generated through an SWSC scheme is connected to a layer mapper and a precoder in series to be mapped to a multi-antenna.

In the signal transmitting apparatus, a plurality of codewords, e.g., two codewords are input to a scrambler 2211 and a scrambler 2213, respectively. The scrambler 2211 scrambles the input codeword based on a preset scrambling scheme to generate a scrambled signal, and the scrambled signal includes two sub-scrambled signals. One of the two sub-scrambled signals is output to a modulation mapper 2219, and the other of the two sub-scrambled signals is output to a buffer 2215. The buffer 2215 buffers the sub-scrambled signal output from the scrambler 2211 during preset time and outputs the buffered sub-scrambled signal to the modulation mapper 2221 at time. Each of the modulation mapper 2219 and the modulation mapper 2221 modulates the input sub-scrambled signal corresponding to a preset modulation scheme to generate a modulated signal, and outputs the modulated signal to an adder 2225. The adder 2225 adds the signal output from the modulation mapper 2219 and the signal output from the modulation mapper 2221 under a control of a controller 2223 to output the added signal to a layer mapper 2235.

The scrambler 2213 scrambles the input codeword based on a preset scrambling scheme to generate a scrambled signal, and the scrambled signal includes two sub-scrambled signals. One of the two sub-scrambled signals is output to a modulation mapper 2227, and the other of the two sub-scrambled signals is output to a buffer 2217. The buffer 2217 buffers the sub-scrambled signal output from the scrambler 2213 during preset time and outputs the buffered sub-scrambled signal to a modulation mapper 2229 at time. Each of the modulation mapper 2227 and the modulation mapper 2229 modulates the input sub-scrambled signal corresponding to a preset modulation scheme to generate a modulated signal, and outputs the modulated signal to an adder 2233. The adder 2233 adds the signal output from the modulation mapper 2227 and the signal output from the modulation mapper 2229 under a control of a controller 2231 to output the added signal to the layer mapper 2235.

The layer mapper 2235 layer-maps the signal output from the adder 2225 and the signal output from the adder 2233 corresponding to a preset layer mapping scheme to generate a layer-mapped signal, and outputs the layer-mapped signal to a precoder 2237. The precoder 2237 precodes the layer-mapped signal output from the layer mapper 2235 based on a preset precoding scheme to output the precoded signal to antenna ports 2239. The antenna ports 2239 transmits the signal output from the precoder 2237 over an air.

While the scrambler 2211, the scrambler 2213, the buffer 2215, the buffer 2217, the modulation mapper 2219, the modulation mapper 2221, the controller 2223, the adder 2225, the modulation mapper 2227, the modulation mapper 2229, the controller 2231, the adder 2233, the layer mapper 2235, the precoder 2237, and the antenna ports 2239 are described in the signal transmitting apparatus as separate units, it is to be understood that this is merely for convenience of description. In other words, two or more of the scrambler 2211, the scrambler 2213, the buffer 2215, the buffer 2217, the modulation mapper 2219, the modulation mapper 2221, the controller 2223, the adder 2225, the modulation mapper 2227, the modulation mapper 2229, the controller 2231, the adder 2233, the layer mapper 2235, the precoder 2237, and the antenna ports 2239 may be incorporated into a single unit.

Still another example of an inner structure of a signal transmitting apparatus to which an SWSC MIMO scheme is applied in a wireless communication system according to an embodiment of the present disclosure has been described with reference to FIG. 22, and an operation in which a UE feeds back a PMI and a BS jointly determines a precoding matrix based on the PMI will be described below. For convenience, it will be assumed that the number of SWSC superposition layers is 2 and a modulation order is fixed.

A UE 1 calculates each rate region, i.e., a rate region $R_1$ and a rate region $R_2$ based on a candidate set of a PMI 1, i.e., a candidate set for $T_{11}$ and $T_{12}$ and a candidate set of a PMI 2, i.e., a candidate set for $T_{21}$ and $T_{22}$ which are given using a channel matrix $H_{11}$ measured for a channel from a BS 1 to the UE 1 and a channel matrix $H_{12}$ measured for a channel from a BS 2 to the UE 1.

For example, if the UE 1 performs a decoding operation in an order of interference signal->desired signal->interference signal->desired signal-> ..., the rate region $R_1$ and the rate region $R_2$ in the UE 1 may be determined as expressed in Equation 3.

$$R_1 = \log\frac{|I + H_{11}K_{X_1}H_{11}^T + H_{12}K_{X_2}H_{12}^T|}{|I + H_{11}K_V H_{11}^T + H_{12}K_{X_2}H_{12}^T|} + \log|I + H_{11}K_V H_{11}^T| \quad \text{Equation 3}$$

$$R_2 = \log\frac{|I + H_{11}K_V H_{11}^T + H_{12}K_{X_2}H_{12}^T|}{|I + H_{11}K_V H_{11}^T|}$$

$$K_{X_1} = E\begin{bmatrix} X_{11} \\ X_{12} \end{bmatrix}\begin{bmatrix} X_{11}^* & X_{12}^* \end{bmatrix} \text{ and } \begin{bmatrix} X_{11} \\ X_{12} \end{bmatrix} = T_{11}\begin{bmatrix} v_{11} \\ v_{12} \end{bmatrix} + T_{12}\begin{bmatrix} u_{11} \\ u_{12} \end{bmatrix}.$$

In Equation 3, $$K_{X_2} = E\begin{bmatrix} X_{21} \\ X_{22} \end{bmatrix}\begin{bmatrix} X_{21}^* & X_{22}^* \end{bmatrix} \text{ and } \begin{bmatrix} X_{21} \\ X_{22} \end{bmatrix} = T_{21}\begin{bmatrix} v_{21} \\ v_{22} \end{bmatrix} + T_{22}\begin{bmatrix} u_{21} \\ u_{22} \end{bmatrix}.$$

In Equation 3,

Meanwhile, a rate region in Equation 3 is based on one symbol, so an average of Minkowski sum is detected for detecting an average rate region among rate regions in Equation 3 in order to detect an average rate region which is based on a codeword including a plurality of symbols. Various information (as candidates) for a candidate set of a PMI 1 and a candidate set of a PMI 2, and an average rate region ($R_1$, $R_2$) corresponding to the candidate set of the PMI 1 and the candidate set of the PMI 2 is fed back to a BS 1.

Meanwhile, an operation in a UE 2 is similar to an operation in a UE 1, and this will be described below.

A UE 2 calculates each rate region ($R_1$, $R_2$) based on a candidate set of a PMI 1, i.e., a candidate set for $T_{11}$ and $T_{12}$ and a candidate set of a PMI 2, i.e., a candidate set for $T_{21}$ and $T_{22}$ which are given using a channel matrix $H_{21}$ measured for a channel from a BS 1 to the UE 2 and a channel matrix $H_{22}$ measured for a channel from a BS 2 to the UE 2.

For example, if the UE 2 performs a decoding operation in an order of interference signal->desired signal->interference signal->desired signal-> . . . , the rate region $R_1$ and the rate region $R_2$ in the UE 2 may be determined as expressed in Equation 4.

$$R_1 = \log\frac{|I + H_{21}K_{X_1}H_{21}^T + H_{22}K_{X_2}H_{22}^T|}{|I + H_{22}K_{X_2}H_{22}^T|} \quad \text{Equation 4}$$

$$R_2 = \log|I + H_{22}K_{X_2}H_{22}^T|$$

In Equation 4, $$K_{X_1} = E\begin{bmatrix}X_{11}\\X_{12}\end{bmatrix}[\,X_{11}^* \ X_{12}^*\,], \begin{bmatrix}X_{11}\\X_{12}\end{bmatrix} = T_{11}\begin{bmatrix}v_{11}\\v_{12}\end{bmatrix} + T_{12}\begin{bmatrix}u_{11}\\u_{12}\end{bmatrix},$$

$$K_{X_2} = E\begin{bmatrix}X_{21}\\X_{22}\end{bmatrix}[\,X_{21}^* \ X_{22}^*\,], \text{ and } \begin{bmatrix}X_{21}\\X_{22}\end{bmatrix} = T_{21}\begin{bmatrix}v_{21}\\v_{22}\end{bmatrix} + T_{22}\begin{bmatrix}u_{21}\\u_{22}\end{bmatrix}.$$

Meanwhile, a rate region in Equation 4 is based on one symbol, so an average of Minkowski sum is detected for detecting an average rate region among rate regions in Equation 4 in order to detect an average rate region which is based on a codeword including a plurality of symbols. Various information (as candidates) for a candidate set of a PMI 1 and a candidate set of a PMI 2, and an average rate region ($R_1$, $R_2$) corresponding to the candidate set of the PMI 1 and the candidate set of the PMI 2 is fed back to a BS 2.

A control unit managing the BS 1 and the BS 2 based on the information fed back from the UE 1 and the UE 2 detects and orders rate regions which occur as an intersection for all candidates with a scheme of detecting an intersection of each average rate region ($R_1$, $R_2$) corresponding to the same PMI 1 and PMI 2 from the UE 1 and the UE 2. The control unit selects a PMI 1 and a PMI 2 corresponding to the maximum rate region among the rate regions which occur as the intersection, and notifies each BS of the selected PMI 1 and PMI 2 thereby each BS uses the selected PMI 1 and PMI 2 when transmitting a signal based on a MIMO SWSC scheme. Here, each BS, i.e., the BS 1 and the BS 2 generates and transmits a MIMO SWSC signal based on the PMI 1 and the PMI 2 notified by the control unit.

Meanwhile, an example of a PMI may be $$T = \frac{1}{\sqrt{2}}\begin{bmatrix}1 & 0\\0 & 1\end{bmatrix} \text{ or } T = \frac{1}{2}\begin{bmatrix}1 & 1\\1 & -1\end{bmatrix},$$

$v_{ij}$ or $u_{ij}$ may be one of $$\pm\frac{1}{\sqrt{2}} \pm \frac{j}{\sqrt{2}}$$

according to a location on a constellation in a case that a modulation scheme is a QPSK scheme, and values included in $H_{ij}$ are determined as complex numbers given according to a channel. Further, E in Equations 3 and 4 means that an expectation value is selected.

A signal transmitting apparatus maps a scrambled signal, i.e., a scrambled codeword to a modulated signal, e.g., a modulation symbol based on a preset mapping scheme. The mapping scheme may be implemented with various forms, and this will be described below.

A mapping scheme in a case that an SWSC MIMO scheme is applied in a wireless communication system according to an embodiment of the present disclosure will be described with reference to FIG. 23.

Figure 23:
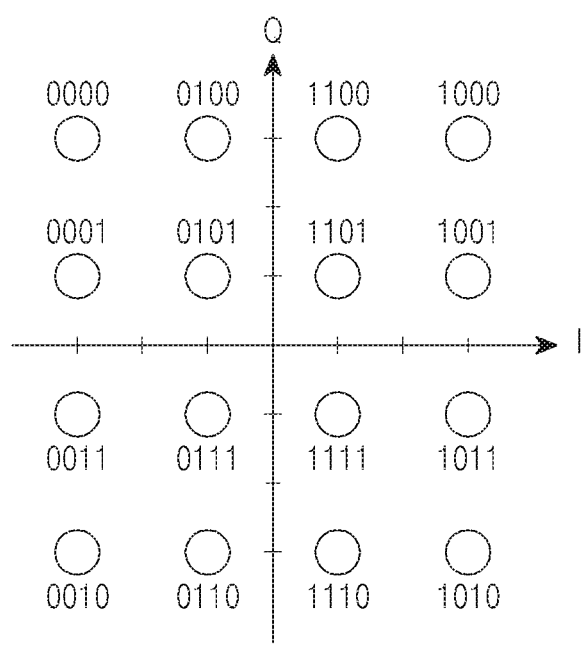
FIG. 23 schematically illustrates a constellation of a 16-QAM scheme in a wireless communication system according to an embodiment of the present disclosure.

FIG. 23 schematically illustrates a constellation of a 16-QAM scheme in a wireless communication system according to an embodiment of the present disclosure.

Referring to FIG. 23, it will be noted that a mapping scheme in FIG. 23 is a mapping scheme in a case that a signal transmitting apparatus uses two antennas and uses a 16-QAM scheme as a modulation scheme.

Since the signal transmitting apparatus uses the two antennas, a 16-QAM symbol is transmitted through each of the two antennas.

Bits included in a scrambled signal, e.g., a scrambled codeword output from a scrambler, e.g., a scrambler 621-1 in FIG. 6 may be classified into a least significant bit (LSB) and a most significant bit (MSB) according to a location mapped to a 16-QAM symbol.

Firstly, a 16-QAM constellation in FIG. 23 will be considered. If bits mapped to a 16-QAM symbol are "1011", an LSB is 01, and an MSB is 11. For example, an MSB among bits mapped to the 16-QAM symbol is related to a quadrant on which the 16-QAM symbol is located among quadrants of the 16-QAM constellation, and an LSB among the bits mapped to the 16-QAM symbol is related to a constellation point within the quadrant on which the 16-QAM symbol is located.

If the two Tx antennas are an antenna 1 and an antenna 2, an LSB and an MSB included in a 16-QAM symbol transmitted through the antenna 1 will be referred to as L1 and M1, respectively.

An LSB and an MSB included in a 16-QAM symbol transmitted through the antenna 2 will be referred to as L2 and M2, respectively.

Figure 24A:
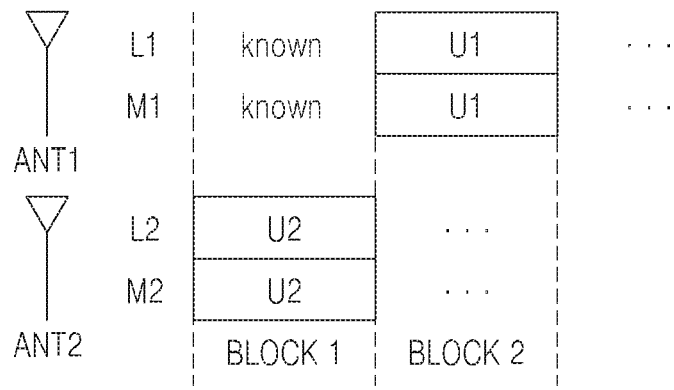
FIGS. 24A and 24B schematically illustrate a mapping scheme in a case that an SWSC MIMO scheme is applied in a wireless communication system according to various embodiments of the present disclosure.
Figure 24B:
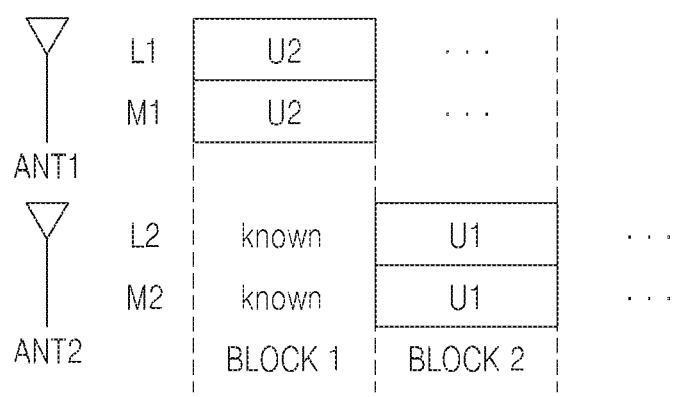

Under an assumption that a scrambled codeword includes a U1 layer signal and a U2 layer signal in an SWSC MIMO scheme, that is, under an assumption that a signal transmitting apparatus applies two sliding-window superposition coding layers, e.g., a U1 layer and a U2 layer to a stream which a signal transmitting apparatus intends to transmit, a mapping scheme proposed in an embodiment of the present disclosure is shown as FIGS. 24A and 24B.

FIGS. 24A and 24B schematically illustrate a mapping scheme in a case that an SWSC MIMO scheme is applied in a wireless communication system according to various embodiments of the present disclosure.

Referring to FIG. 24A, a mapping scheme in FIG. 24A is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(L1, M1) and U2=(L2, M2). For convenience, it will be noted that the mapping scheme in FIG. 24A is expressed by considering only two blocks, e.g., a block 1 and a block 2.

As shown in FIG. 24A, a known message is transmitted through an antenna 1 and a U2 codeword is transmitted through an antenna 2 in a block 1, and a U1 codeword is transmitted through the antenna 1 and a U2 codeword (not shown in FIG. 24A) included in an N2 message is transmitted through the antenna 2 in a block 2. The N2 message is transmitted after a currently transmitted message, i.e., an N1 message, and includes a U1 codeword and a U2 codeword. It will be noted that a U1 codeword and a U2 codeword in FIG. 24A are a U1 codeword and a U2 codeword included in a currently transmitted message, i.e., an N1 message.

Referring to FIG. 24B, a mapping scheme in FIG. 24B is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(L2, M2) and U2=(L1, M1). For convenience, it will be noted that the mapping scheme in FIG. 24A is expressed by considering only two blocks, e.g., a block 1 and a block 2.

As shown in FIG. 24B, a U2 codeword is transmitted through an antenna 1 and a known message is transmitted through an antenna 2 in a block 1. A U2 codeword included in an N2 message (not shown in FIG. 24B) is transmitted through the antenna 1 and a U1 codeword is transmitted through the antenna 2 in a block 2. It will be noted that a U1 codeword and a U2 codeword in FIG. 24B are a U1 codeword and a U2 codeword included in a currently transmitted message, i.e., an N1 message.

An example of a mapping scheme in a case that an SWSC MIMO scheme is applied in a wireless communication system according to an embodiment of the present disclosure has been described with reference to FIGS. 24A and 24B, and another example of a mapping scheme in a case that an SWSC MIMO scheme is applied in a wireless communication system according to an embodiment of the present disclosure will be described with reference to FIGS. 25A to 25D.

FIGS. 25A to 25D schematically illustrate another example of a mapping scheme in a case that an SWSC MIMO scheme is applied in a wireless communication system according to various embodiments of the present disclosure.

Figure 25A:
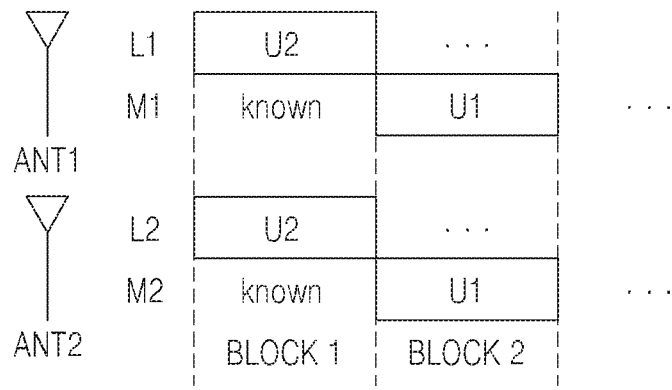
FIGS. 25A to 25D schematically illustrate a mapping scheme in a case that an SWSC MIMO scheme is applied in a wireless communication system according to various embodiments of the present disclosure.

Referring to FIG. 25A, a mapping scheme in FIG. 25A is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(M1, M2) and U2=(L1, L2). For convenience, it will be noted that the mapping scheme in FIG. 25A is expressed by considering only two blocks, e.g., a block 1 and a block 2.

As shown in FIG. 25A, L1 included in a U2 codeword and a known message are transmitted through an antenna 1 and L2 included in a U2 codeword and a known message are transmitted through an antenna 2 in a block 1. L1 (not shown in FIG. 25A) included in a U2 message included in an N2 message and M1 included in a U1 codeword are transmitted through the antenna 1 and L2 (not shown in FIG. 25A) included in a U2 codeword included in an N2 message and M2 included in a U1 codeword are transmitted through the antenna 2 in a block 2. It will be noted that a U1 codeword and a U2 codeword in FIG. 25A are a U1 codeword and a U2 codeword included in a currently transmitted message, i.e., an N1 message.

Figure 25B:
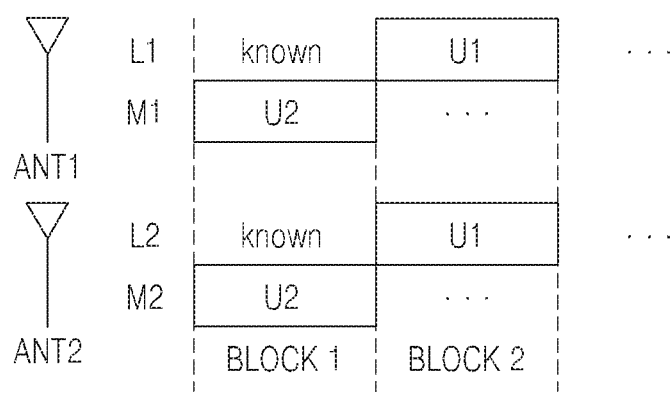

Referring to FIG. 25B, a mapping scheme in FIG. 25B is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(L1, L2) and U2=(M1, M2). For convenience, it will be noted that the mapping scheme in FIG. 25B is expressed by considering only two blocks, e.g., a block 1 and a block 2.

As shown in FIG. 25B, a known message and M1 included in a U2 codeword are transmitted through an antenna 1 and a known message and M2 included in a U2 codeword are transmitted through an antenna 2 in a block 1. L1 included in a U1 codeword and M1 (not shown in FIG. 25B) included in a U2 codeword included in an N2 message are transmitted through the antenna 1 and L2 included in a U1 codeword and M2 (not shown in FIG. 25B) included in a U2 codeword included in an N2 message are transmitted through the antenna 2 in a block 2. It will be noted that a U1 codeword and a U2 codeword in FIG. 25B are a U1 codeword and a U2 codeword included in a currently transmitted message, i.e., an N1 message.

Figure 25C:
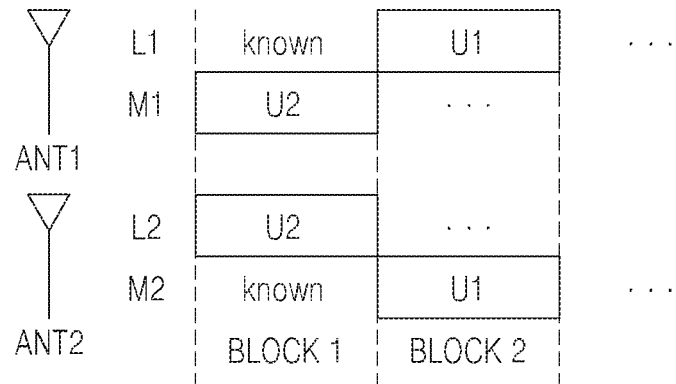

Referring to FIG. 25C, a mapping scheme in FIG. 25C is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(L1, M2) and U2=(M1, L2). For convenience, it will be noted that the mapping scheme in FIG. 25C is expressed by considering only two blocks, e.g., a block 1 and a block 2.

As shown in FIG. 25C, a known message and M1 included in a U2 codeword are transmitted through an antenna 1 and L2 included in a U2 codeword and a known message are transmitted through an antenna 2 in a block 1. L1 included in a U1 codeword and M1 (not shown in FIG. 25C) included in a U2 codeword included in an N2 message are transmitted through the antenna 1 and L2 (not shown in FIG. 25C) included in a U2 codeword included in an N2 message and M2 included in a U1 codeword are transmitted through the antenna 2 in a block 2. It will be noted that a U1 codeword and a U2 codeword in FIG. 25C are a U1 codeword and a U2 codeword included in a currently transmitted message, i.e., an N1 message.

Figure 25D:
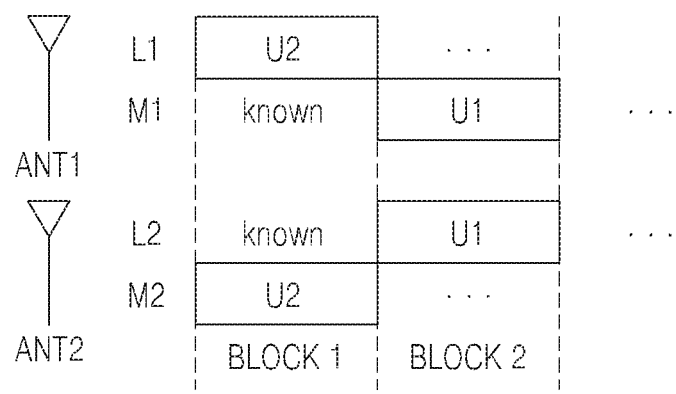

Referring to FIG. 25D, a mapping scheme in FIG. 25D is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(M1, L2) and U2=(L1, M2). For convenience, it will be noted that the mapping scheme in FIG. 25D is expressed by considering only two blocks, e.g., a block 1 and a block 2.

As shown in FIG. 25D, L1 included in a U2 codeword and a known message are transmitted through an antenna 1 and a known message and M2 included in a U2 codeword are transmitted through an antenna 2 in a block 1. L1 (not shown in FIG. 25D) included in a U2 codeword included in an N2 message is transmitted through the antenna 1 and L2 included in a U1 codeword and M2 (not shown in FIG. 25D) included in a U2 codeword included in an N2 message are transmitted through the antenna 2 in a block 2. It will be noted that a U1 codeword and a U2 codeword in FIG. 25D are a U1 codeword and a U2 codeword included in a currently transmitted message, i.e., an N1 message.

Another example of a mapping scheme in a case that an SWSC MIMO scheme is applied in a wireless communication system according to an embodiment of the present disclosure has been described with reference to FIGS. 25A to 25D, and still another example of a mapping scheme in a case that an SWSC MIMO scheme is applied in a wireless communication system according to an embodiment of the present disclosure will described with reference to FIG. 26.

Figure 26:
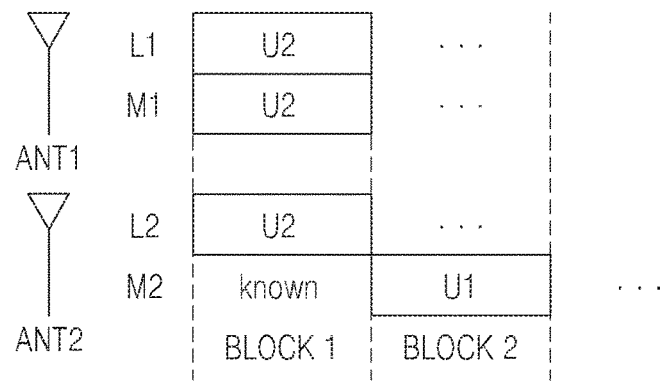
FIG. 26 schematically illustrates a mapping scheme in a case that an SWSC MIMO scheme is applied in a wireless communication system according to an embodiment of the present disclosure.

FIG. 26 schematically illustrates a mapping scheme in a case that an SWSC MIMO scheme is applied in a wireless communication system according to an embodiment of the present disclosure.

Referring to FIG. 26, it will be noted that a mapping scheme in FIG. 26 is a mapping scheme in a case that a length of a bit sequence included in a U1 codeword is different from a length of a bit sequence included in a U2 codeword, i.e., a case that the number of bits included in the U1 codeword is different from the number of bits included in the U2 codeword.

Further, it will be understood that mapping schemes in FIGS. 24A and 24B, and 25A to 25D are mapping schemes in a case that a length of a bit sequence included in a U1 codeword is equal to a length of a bit sequence included in a U2 codeword, i.e., a case that the number of bits included in the U1 codeword is equal to the number of bits included in the U2 codeword.

Referring back to FIG. 26, a mapping scheme in FIG. 26 is a mapping scheme in a case that a signal transmitting apparatus uses two antennas, e.g., an antenna 1 and an antenna 2, and applies two sliding-window superposition coding layers, e.g., a U1 layer and a U2 layer, and more particularly, in a case of U1=(M2) and U2=(L1, M1, L2). For convenience, it will be noted that the mapping scheme in FIG. 26 is expressed by considering only two blocks, e.g., a block 1 and a block 2.

As shown in FIG. 26, L1 included in a U2 codeword and M1 included in a U2 codeword are transmitted through an antenna 1 and L2 included in a U2 codeword and a known message are transmitted through an antenna 2 in a block 1. L1 and M1 (not shown in FIG. 26) included in a U2 codeword included in an N2 message are transmitted through the antenna 1 and L2 (not shown in FIG. 26) included in a U2 codeword included in an N2 message and M2 included in a U1 codeword are transmitted through the antenna 2 in a block 2. It will be noted that a U1 codeword and a U2 codeword in FIG. 26 are a U1 codeword and a U2 codeword included in a currently transmitted message, i.e., an N1 message.

As shown in FIG. 26, in a case that a length of a bit sequence included in a U1 codeword is different from a length of a bit sequence included in a U2 codeword, that is, in a case that the number of bits included in the U1 codeword is 1 and the number of bits included in the U2 codeword is 3, it will be understood that there are eight possible mapping schemes including a mapping scheme as shown in FIG. 26. For example, it will be understood that a U1 codeword includes one element, e.g., M2, and a U2 codeword includes three elements, e.g., L1, M1, and L2, so there are 8 (=4C3× 2) possible mapping schemes including a mapping scheme as shown in FIG. 26.

Still another example of a mapping scheme in a case that an SWSC MIMO scheme is applied in a wireless communication system according to an embodiment of the present disclosure has been described with reference to FIG. 26, and still another example of a mapping scheme in a case that an SWSC MIMO scheme is applied in a wireless communication system according to an embodiment of the present disclosure will described with reference to FIG. 27.

Figure 27:
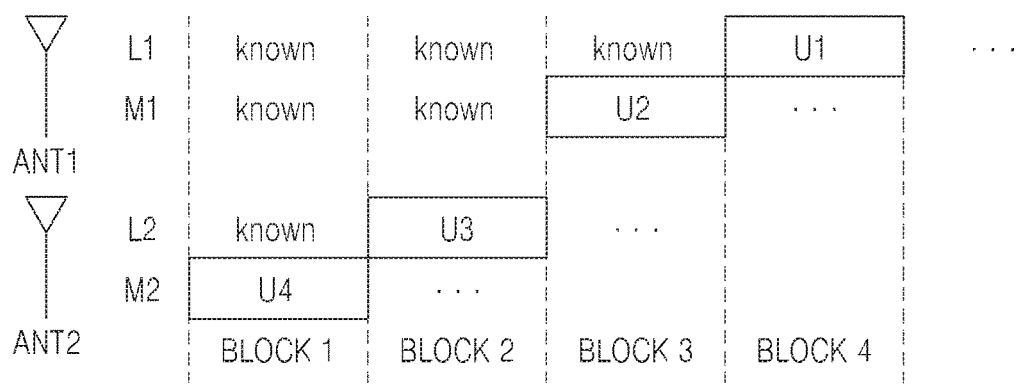
FIG. 27 schematically illustrates a mapping scheme in a case that an SWSC MIMO scheme is applied in a wireless communication system according to an embodiment of the present disclosure.

FIG. 27 schematically illustrates a mapping scheme in a case that an SWSC MIMO scheme is applied in a wireless communication system according to an embodiment of the present disclosure.

Referring to FIG. 27, a mapping scheme in FIG. 27 is a mapping scheme in a case that a signal transmitting apparatus uses two antennas, e.g., an antenna 1 and an antenna 2, and applies four sliding-window superposition coding layers, e.g., a U1 layer, a U2 layer, a U3 layer, and a U4 layer, and more particularly, in a case of U1=L1, U2=M1, U3=L2, and U4=M2. For convenience, it will be noted that the mapping scheme in FIG. 27 is expressed by considering only four blocks, e.g., a block 1, a block 2, a block 3, and a block 4.

As shown in FIG. 27, a known message is transmitted through an antenna 1 and a known message and a U4 codeword, i.e., M2 are transmitted through an antenna 2 in a block 1. A known message is transmitted through the antenna 1 and a U3 codeword, i.e., L2 and a U4 codeword (not shown in FIG. 27) included in an N2 message are transmitted through the antenna 2 in a block 2. If a current message including a U1 codeword to a U4 codeword as shown in FIG. 27 is an N1 message, an N2 message is a message transmitted after the N1 message, and the N2 message includes a U1 codeword to a U4 codeword.

A known message and a U2 codeword, i.e., M1 are transmitted through the antenna 1, and a U3 codeword (not shown in FIG. 27) included in an N2 message and a U4 codeword (not shown in FIG. 27) included in an N3 message are transmitted through the antenna 2 in a block 3. Here, an N3 message is a message transmitted after an N2 message, and the N3 message includes a U1 codeword to a U4 codeword.

A U1 codeword, i.e., L1 and a U2 codeword (not shown in FIG. 27) included in an N2 message are transmitted through the antenna 1, and a U3 codeword (not shown in FIG. 27) included in an N3 message and a U4 codeword (not shown in FIG. 27) included in an N4 message are transmitted through the antenna 2 in a block 4. Here, an N4 message is a message transmitted after an N3 message, and the N4 message includes a U1 codeword to a U4 codeword. It will be noted that a U1 codeword to a U4 codeword in FIG. 27 are a U1 codeword to a U4 codeword included in a currently transmitted message, i.e., an N1 message.

Further, it will be understood that there are 24 possible mapping schemes including a mapping scheme as shown in FIG. 27 under an assumption as a situation in FIG. 27. For example, it will be understood that each of a U1 codeword to a U4 codeword includes one element, so there are 24 (=4C1×3C1×2C1) possible mapping schemes including a mapping scheme as shown in FIG. 27.

In a mapping scheme as described in FIG. 27, a symbol sequence transmitted through an antenna 1 is determined through a superposition of symbol unit between a U1 layer and a U2 layer. Similarly, a symbol sequence transmitted through an antenna 2 is determined through a superposition of symbol unit between a U3 layer and a U4 layer. As described in FIGS. 23, 24A, 24B, 25A, 25B, 25C, 25D, 26, and 27, a mapping scheme, i.e., a mapping scheme used in a modulation mapper, proposed in an embodiment of the present disclosure is determined based on the number of layers used in an SWSC scheme, the number of antennas used in a signal transmitting apparatus, and the number of bits included in a modulation symbol.

As described above, a mapping scheme according to an embodiment of the present disclosure is based on the number of sliding-window superposition coding layers used in an SWSC scheme, the number of antennas used in a signal transmitting apparatus, and the number of bits included in a modulation symbol, so a plurality of mapping schemes may be implemented. In a case that a plurality of mapping schemes are implemented under the same condition, a signal transmitting apparatus may use all or a part of the plurality of mapping schemes.

If the signal transmitting apparatus uses part of the plurality of mapping schemes, the signal transmitting apparatus may select the part of the plurality of mapping schemes based on a preset criterion, and this will be described below.

Firstly, the signal transmitting apparatus may select mapping schemes among the plurality of mapping schemes based on a theoretical threshold for a transmission throughput. Here, there are many schemes of detecting a theoretical threshold for a transmission throughput, and a detailed description thereof will be omitted herein.

Secondly, the signal transmitting apparatus may select mapping schemes thereby maximizing a minimum distance between modulation symbols.

Thirdly, the signal transmitting apparatus may select mapping schemes thereby there is no ambiguity when detecting a desired signal, e.g., a desired symbol after cancelling an interference signal for a signal which a signal receiving apparatus receives by applying a mapping scheme.

Fourthly, the signal transmitting apparatus may select mapping schemes thereby effective channels which the same codeword experiences are maintained within a preset range.

The signal transmitting apparatus may select mapping schemes by considering only one of the four schemes, or at least two of the four schemes.

Meanwhile, the signal transmitting apparatus may select the mapping schemes whenever an event occurs or may periodically select the mapping schemes. Alternatively, the signal transmitting apparatus may use only certain mapping schemes.

Meanwhile, the signal transmitting apparatus needs to transmit, to a signal receiving apparatus, information related to a mapping scheme selected by the signal transmitting apparatus, and this will be described below.

Firstly, if a mapping scheme used in a signal transmitting apparatus is fixed, the signal transmitting apparatus and a signal receiving apparatus know the mapping scheme already, so there is no need for transmitting and receiving information related to the mapping scheme.

Secondly, if there are a plurality of mapping schemes which may be used in a signal transmitting apparatus, the signal transmitting apparatus needs to select one of the plurality of mapping schemes and transmit information related to the selected mapping scheme to a signal receiving apparatus. For example, a mapping scheme index is allocated to each of the plurality of mapping schemes which may be used in the signal transmitting apparatus, and the signal transmitting apparatus transmits a mapping scheme index of a mapping scheme to be used in the signal transmitting apparatus to the signal receiving apparatus.

Here, the information related to the mapping scheme may be transmitted through a control channel used in a wireless communication system using an SWSC MIMO scheme according to an embodiment of the present disclosure. For example, if the wireless communication system using the SWSC MIMO scheme according to an embodiment of the present disclosure is an LTE mobile communication system, the information related to the mapping scheme may be transmitted through a physical downlink control channel (PDCCH).

Alternatively, the information related to the mapping scheme may be transmitted through a radio resource control (RRC) message used in a wireless communication system using an SWSC MIMO scheme according to an embodiment of the present disclosure. The RRC message through which the information related to the mapping scheme is transmitted may be implemented with a new RRC message or may be implemented by modifying an existing RRC message.

Meanwhile, a signal receiving apparatus receives information related to a mapping scheme from a signal transmitting apparatus, and performs a receiving operation based on the mapping scheme.

In the description above, a signal transmitting apparatus transmits information related to a mapping scheme, and a signal receiving apparatus receives the information related to the mapping scheme transmitted from the signal transmitting apparatus and performs a receiving operation based on the mapping scheme. However, the signal receiving apparatus may directly select a mapping scheme. In this case, a scheme of selecting a mapping scheme in a signal receiving apparatus may be similar to a scheme of selecting a mapping scheme in a signal transmitting apparatus, however, the signal receiving apparatus needs to transmit information related to the mapping scheme selected by the signal receiving apparatus to the signal transmitting apparatus.

In this case, the information related to the mapping scheme may be transmitted through a control channel used in a wireless communication system using an SWSC MIMO scheme according to an embodiment of the present disclosure. For example, if a wireless communication system using an SWSC MIMO scheme according to an embodiment of the present disclosure is an LTE mobile communication system, the information related to the mapping scheme may be transmitted through a physical uplink control channel (PUCCH).

The information related to the mapping scheme may be transmitted through an RRC message used in a wireless communication system using an SWSC MIMO scheme according to an embodiment of the present disclosure. The RRC message through which the information related to the mapping scheme is transmitted may be implemented with a new RRC message or modification of an existing RRC message.

The information related to the mapping scheme may be transmitted through a physical uplink shared channel (PUSCH) used in a wireless communication system using an SWSC MIMO scheme according to an embodiment of the present disclosure.

The information related to the mapping scheme may be transmitted through a data channel used in a wireless communication system using an SWSC MIMO scheme according to an embodiment of the present disclosure.

Accordingly, a signal transmitting apparatus receives information related to a mapping scheme from a signal receiving apparatus, and performs a transmitting operation based on the mapping scheme.

An inner structure of a signal receiving apparatus in a wireless communication system supporting an SWSC MIMO scheme according to an embodiment of the present disclosure will be described with reference to FIG. 28.

Figure 28:
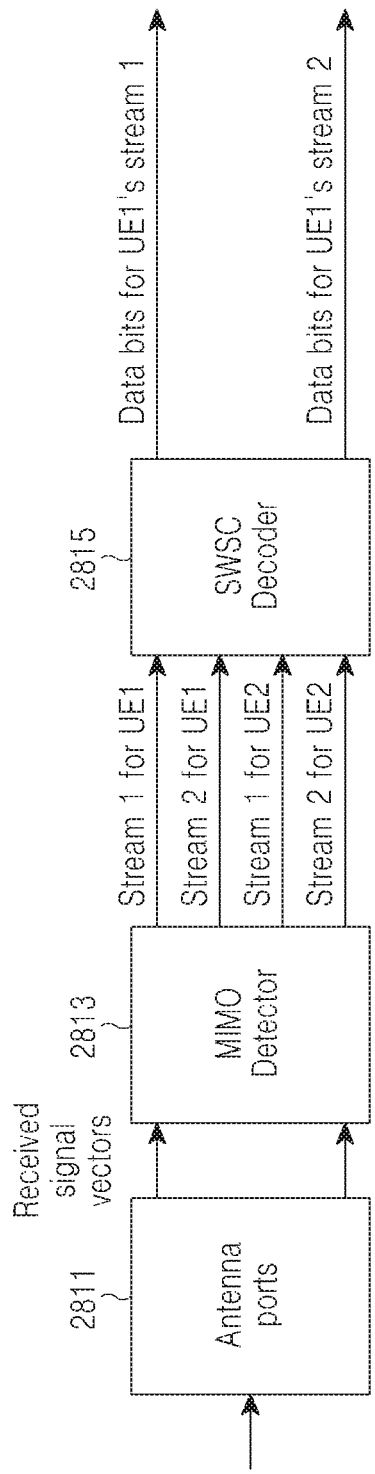
FIG. 28 schematically illustrates an inner structure of a signal receiving apparatus in a wireless communication system supporting an SWSC MIMO scheme according to an embodiment of the present disclosure.

FIG. 28 schematically illustrates an inner structure of a signal receiving apparatus in a wireless communication system supporting an SWSC MIMO scheme according to an embodiment of the present disclosure.

Referring to FIG. 28, an inner structure of a signal receiving apparatus in FIG. 28 indicates an inner structure of a UE1, and a signal for a UE2 becomes an interference signal to the UE1.

The signal receiving apparatus includes antenna ports 2811, a MIMO detector 2813, and an SWSC decoder 2815. The antenna ports 2811 are antenna ports in a case that the number of Rx antennas is 2, and the number of streams used in each UE is 2.

Received signal vectors received through the antenna ports 2811 are transferred to the MIMO detector 2813. The MIMO detector 2813 detects a stream 1 and a stream 2 for a UE1 and detects a stream 1 and a stream 2 for a UE2 by applying a preset MIMO detecting scheme to the received signal vectors, and outputs the stream 1 and the stream 2 for the UE1 and the stream 1 and the stream 2 for the UE2 to the SWSC decoder 2815. The SWSC decoder 2815 detects data bits for the stream 1 and the stream 2 for the UE1 by performing a decoding operation corresponding to a preset SWSC decoding scheme. The decoding operation corresponding to the SWSC decoding scheme has been described above, and a detailed description thereof will be omitted herein.

An inner structure of a signal receiving apparatus in a wireless communication system supporting an SWSC MIMO scheme according to an embodiment of the present disclosure has been described with reference to FIG. 28, and an example of an inner structure of a UE in a wireless communication system supporting an SWSC MIMO scheme according to an embodiment of the present disclosure will be described with reference to FIG. 29.

Figure 29:
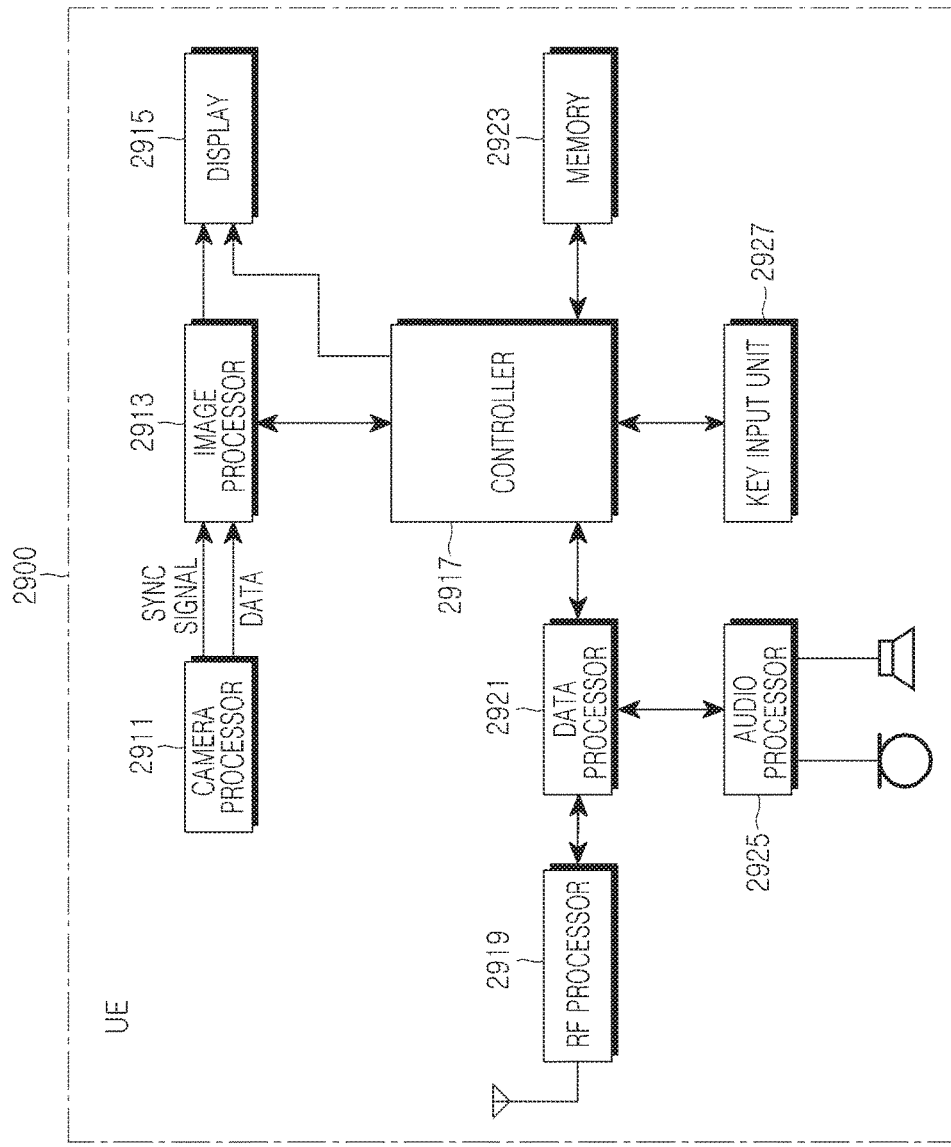
FIG. 29 schematically illustrates an inner structure of a UE in a wireless communication system supporting an SWSC MIMO scheme according to an embodiment of the present disclosure.

FIG. 29 schematically illustrates an inner structure of a UE in a wireless communication system supporting an SWSC MIMO scheme according to an embodiment of the present disclosure.

Referring to FIG. 29, a UE 2900 may be connected with an external electronic device (not illustrated in FIG. 29) using at least one of a communication module, a connector, and an earphone connecting jack. The electronic device may include one of various devices which are removable from the UE 2900 and are connectible with the UE 2900 in a wired manner, such as, for example, an earphone, an external speaker, a universal serial bus (USB) memory, a charging device, a cradle/dock, a DMB antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a Wi-Fi Direct communication device, a wireless AP, and the like. The UE 2900 may be connected with a server or another communication device such as, for example, one of a cellular phone, a smart phone, a tablet PC, a desktop PC, and a server, in a wired or wireless manner.

The UE 2900 includes a camera processor 2911, an image processor 2913, a display 2915, a controller 2917, an RF processor 2919, a data processor 2921, a memory 2923, an audio processor 2925, and a key input unit 2927.

The RF processor 2919 is responsible for radio communication of the UE 2900. The RF processor 2919 includes a RF transmitter for frequency up-converting transmission signals and amplifying the up-converted signals, and a RF receiver for low-noise-amplifying received signals and frequency down-converting the amplified signals.

The data processor 2921 includes a transmitter for encoding and modulating the transmission signals, and a receiver for demodulating and decoding the received signals. In other words, the data processor 2921 may include a MODEM and a coder/decoder (CODEC). The CODEC includes a data CODEC for processing packet data, and an audio CODEC for processing audio signals, such as voice.

The audio processor 2925 plays received audio signals output from the audio CODEC in the data processor 2921 using a speaker, and transfers transmission audio signals picked up by a microphone to the audio CODEC in the data processor 2921.

The key input unit 2927 includes numeric/character keys for inputting numeric and character information and function keys for setting various functions.

A memory 2923 may include a program memory, a data memory, and the like. The program memory may store programs for controlling the general operation of the UE 2900. In accordance with an embodiment to the present disclosure, the program memory may store programs related to an operation of transmitting and receiving a signal in a wireless communication system using an SWSC MIMO scheme, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, a CSI, a PMI, a QoS, and the number of antennas included in a feedback message received from the UE 2900. The QAM modulation layer according to the number of streams and the structure of the sliding-window superposition coding layer may be implemented based on a mapping scheme, the mapping scheme has been described above, and a detailed description thereof will be omitted herein. The data memory may temporarily store the data generated during execution of these programs.

The memory 2923 may be implemented as an arbitrary data storing device, such as a read only memory (ROM), a random access memory (RAM), and a memory card (for example, a secure digital (SD) card, and a memory stick). The memory 2923 may include a non-volatile memory, a volatile memory, a hard disk drive (HDD), or a solid state drive (SSD).

The memory 2923 may also store applications of various functions, such as navigation, video communication, games, an alarm application based on time, images for providing a graphical user interface (GUI) related to the applications, user information, documents, databases or data related to a method for processing touch inputs, background images (for example, a menu screen, a standby screen, and so forth), operation programs necessary for driving the UE 2900, and images captured by the camera processor 2911.

The memory 2923 is a media which is red though a machine, e.g., a computer. Here, the term "machine-readable medium" includes a medium for providing data to the machine to allow the machine to execute a particular function. The memory 2923 may include non-volatile media and volatile media. Such a medium needs to be of a tangible type so that commands delivered to the medium can be detected by a physical tool which reads the commands with the machine.

The machine-readable medium may include, but is not limited to, at least one of a floppy disk, a flexible disk, a hard disk, a magnetic tape, a compact disc ROM (CD-ROM), an optical disk, a punch card, a paper tape, a RAM, a programmable ROM (PROM), an erasable PROM (EPROM), and a flash-EPROM.

The controller 2917 controls the overall operation of the UE 2900. The controller 2917 performs an operation related to an operation of transmitting and receiving a signal in a wireless communication system using an SWSC MIMO scheme, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, a CSI, a PMI, a QoS, and the number of antennas included in a feedback message received from the UE 2900. The operation related to the operation of transmitting and receiving the signal in the wireless communication system using the SWSC MIMO scheme, e.g., the operation of determining, by the BS, the number of streams and the structure of the sliding-window superposition coding layer, the QAM combination according to the number of streams and the structure of the sliding-window superposition coding layer, the layer of the QAM modulation layer, and the beamforming matrix delivering each SWSC superposition layer in order to generate the desired achievable rate region based on the CQI, the CSI, the PMI, the QoS, and the number of antennas included in the feedback message received from the UE 2900 is performed in the manner described before with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, so a detailed description thereof will be omitted herein. The QAM modulation layer according to the number of streams and the structure of the sliding-window superposition coding layer may be implemented based on a mapping scheme, the mapping scheme has been described above, and a detailed description thereof will be omitted herein.

A camera processor 2911 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 2913 performs image signal processing (ISP) for displaying the image signals output from the camera processor 2911 on the display 2915. The ISP may include gamma correction, interpolation, spatial variations, image effects, image scaling, automatic white balance (AWB), automatic exposure (AE), and automatic focus (AF). The image processor 2913 processes the image signals output from the camera processor 2911 on a frame-by-frame basis, and outputs the frame image data according to the characteristics and size of the display 2915.

The image processor 2913 includes a video codec, which compresses the frame image data displayed on the display 2915 by a preset coding scheme, and decompresses the compressed frame image data into the original frame image data. The video codec may include a joint photographic experts group (JPEG) codec, an MPEG4 CODEC, and a wavelet CODEC. The image processor 2913 is assumed to have an on-screen display (OSD) function, and may output OSD data according to the size of the displayed screen, under control of the controller 2917.

The display 2915 displays, on its screen, image signals output from the image processor 2913 and user data output from the controller 2917. The display 2915 may include a liquid crystal display (LCD). In this case, the display 2915 may include an LCD controller, a memory capable of storing image data, and an LCD panel. When implemented in a touch screen manner, the LCD may serve as an input unit. In this case, the same keys as those on the key input unit 2927 may be displayed on the display 2915.

If the display 2915 is implemented as the touch screen, the display 2915 outputs an analog signal, which corresponds to at least one input to a user graphic interface, to the controller 2917.

The display 2915 receives at least one user inputs through a user's body (for example, a finger including a thumb) or the key input unit 2927 (for example, a stylus pen or an electronic pen).

The display 2915 receives continuous motions on one touch (for example, a drag). The display 2915 outputs an analog signal corresponding to the continuous motions to the controller 2917.

In an embodiment of the present disclosure, a touch may also include a non-contact touch (for example, when the user input means is positioned within a distance of, for example, 1 cm) in which the user input means may be detected without a direct contact with the display 2915. The touch may also include a direct contact between the display 2915 and a finger or the key input unit 2927. A distance or interval from the display 2915 within which the user input means may be detected may be changed according to the capability or structure of the UE 2900. More particularly, to separately detect a direct touch event based on a contact with the user input means and an indirect touch event (that is, a hovering event), the display 2915 may be configured to output different values for values (for example, an analog voltage value or current value) detected in the direct touch event and the hovering event.

The display 2915 may be implemented as, for example, a resistive type, a capacitive type, an infrared type, an acoustic wave type, or a combination thereof.

The display 2915 may include at least two touch panels capable of sensing a touch, an approach of a finger, or the key input unit 2927 to receive inputs generated by the finger or the key input unit 2927. The at least two touch panels provide different output values to the controller 2917. Thus, the controller 2917 differently recognizes the values input from the at least two touch screen panels to identify whether the input from the display 2915 is the input generated by the finger or by the key input unit 2927.

The controller 2917 converts the analog signal received from the display 2915 into a digital signal and controls the display 2915 using the digital signal. For example, the controller 2917 may control a shortcut icon (not illustrated in FIG. 29) displayed on the display 2915 to be selected or executed in response to a direct touch event or a hovering event.

The controller 2917, by detecting a value (for example, an electric-current value) output through the display 2915, recognizes a hovering interval or distance as well as a user input position and converts the recognized distance into a digital signal (for example, a Z coordinate). The controller 2917 may also, by detecting the value output through the display 2915, detect a pressure applied by the user input means to the display 2915, and convert the detected pressure into a digital signal.

While the camera processor 2911, the image processor 2913, the display 2915, the controller 2917, the RF processor 2919, the data processor 2921, the memory 2923, the audio processor 2925, and the key input unit 2927 are shown in FIG. 29 as separate units, it is to be understood that this is for merely convenience of description. In other words, two or more of the camera processor 2911, the image processor 2913, the display 2915, the controller 2917, the RF processor 2919, the data processor 2921, the memory 2923, the audio processor 2925, and the key input unit 2927 may be incorporated into a single unit.

Alternatively, the 2900 may be implemented with one processor.

An inner structure of a UE in a wireless communication system using an SWSC MIMO scheme according to an embodiment of the present disclosure has been described with reference to FIG. 29, and another example of an inner structure of a UE in a wireless communication system using an SWSC MIMO scheme according to an embodiment of the present disclosure will be described with reference to FIG. 30.

Figure 30:
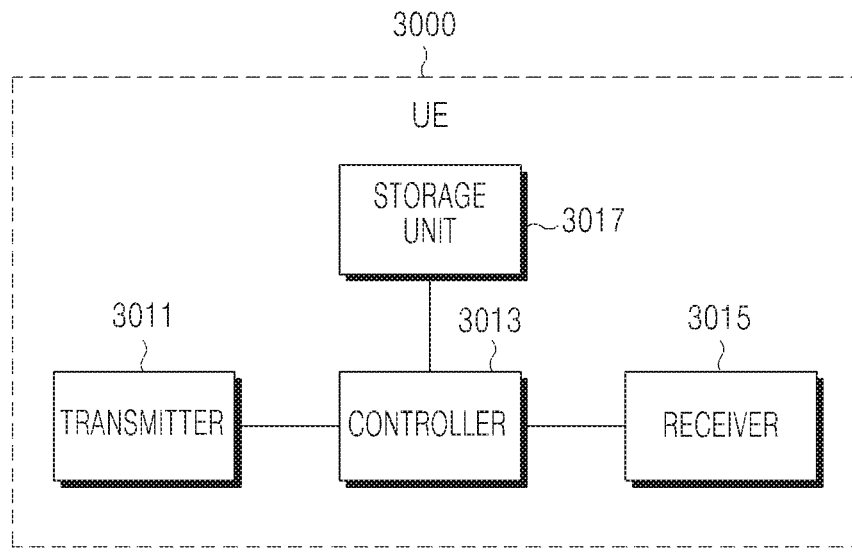
FIG. 30 schematically illustrates an inner structure of a UE in a wireless communication system using an SWSC MIMO scheme according to an embodiment of the present disclosure.

FIG. 30 schematically illustrates an inner structure of a UE in a wireless communication system using an SWSC MIMO scheme according to an embodiment of the present disclosure.

Referring to FIG. 30, a UE 3000 includes a transmitter 3011, a controller 3013, a receiver 3015, and a storage unit 3017.

The controller 3013 controls the overall operation of the UE 3000. More particularly, the controller 3013 controls an operation related to an operation of transmitting and receiving a signal in a wireless communication system using an SWSC MIMO scheme according to an embodiment of the present disclosure, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, CSI, a PMI, a QoS, and the number of antennas included in a feedback message received from the UE. The operation related to the operation of transmitting and receiving the signal in the wireless communication system using the SWSC MIMO scheme according to an embodiment of the present disclosure, e.g., the operation of determining, by the BS, the number of streams and the structure of the sliding-window superposition coding layer, the QAM combination according to the number of streams and the structure of the sliding-window superposition coding layer, the layer of the QAM modulation layer, and the beamforming matrix delivering each SWSC superposition layer in order to generate the desired achievable rate region based on the CQI, the CSI, the PMI, the QoS, and the number of antennas included in the feedback message received from the UE has been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed operation thereof will be omitted herein. The QAM combination according to the number of streams and the structure of the sliding-window superposition coding layer may be implemented based on a mapping scheme, the mapping scheme has been described above, and a detailed description thereof will be omitted herein.

The transmitter 3011 transmits various signals and various messages to other entities, e.g., a BS, and/or the like in the wireless communication system using the SWSC MIMO scheme under a control of the controller 3013. The various signals and various messages transmitted in the transmitter 3011 have been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed description thereof will be omitted herein.

The receiver 3015 receives various signals and various messages from other entities, e.g., a BS, and/or the like in the wireless communication system using the SWSC MIMO scheme under a control of the controller 3013. The various signals and various messages received in the receiver 3015 have been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed description thereof will be omitted herein.

The storage unit 3017 stores various programs, various data, and/or the like related to an operation related to an operation of transmitting and receiving a signal in a wireless communication system supporting an SWSC MIMO scheme according to an embodiment of the present disclosure, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, CSI, a PMI, a QoS, and the number of antennas included in a feedback message received from the UE, performed in the UE 3000 under a control of the controller 3013.

The storage unit 3017 stores various signals and various messages which are received by the receiver 3015 from the BS, and/or the like.

While the transmitter 3011, the controller 3013, the receiver 3015, and the storage unit 3017 are described in the UE 3000 as separate units, it is to be understood that this is merely for convenience of description. In other words, two or more of the transmitter 3011, the controller 3013, the receiver 3015, and the storage unit 3017 may be incorporated into a single unit.

The UE 3000 may be implemented with one processor.

Another example of an inner structure of a UE in a wireless communication system using an SWSC MIMO scheme according to an embodiment of the present disclosure has been described with reference to FIG. 30, and another example of an inner structure of a BS in a wireless communication system using an SWSC MIMO scheme according to an embodiment of the present disclosure will be described with reference to FIG. 31.

Figure 31:
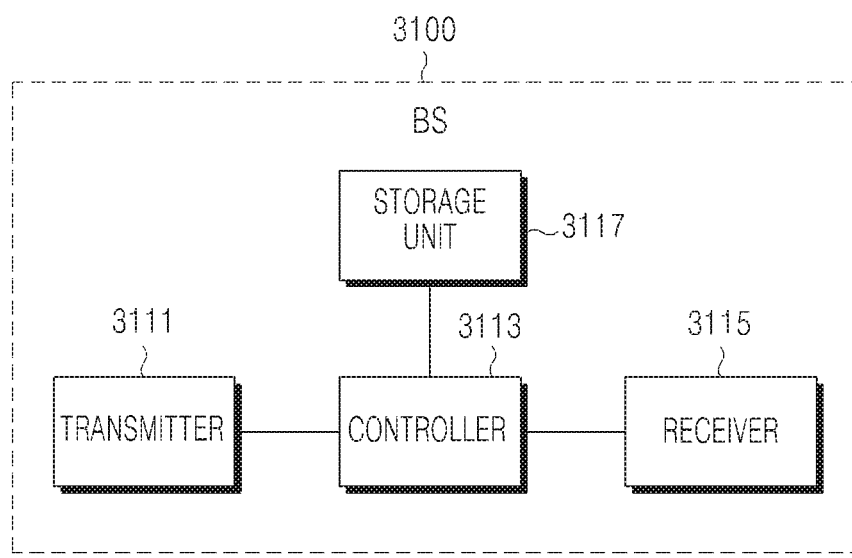
FIG. 31 schematically illustrates an inner structure of a BS in a wireless communication system using an SWSC MIMO scheme according to an embodiment of the present disclosure.

FIG. 31 schematically illustrates an inner structure of a BS in a wireless communication system using an SWSC MIMO scheme according to an embodiment of the present disclosure.

Referring to FIG. 31, a BS 3100 includes a transmitter 3111, a controller 3113, a receiver 3115, and a storage unit 3117.

The controller 3113 controls the overall operation of the BS 3100. More particularly, the controller 3113 controls an operation related to an operation of transmitting and receiving a signal in a wireless communication system supporting an SWSC MIMO scheme according to an embodiment of the present disclosure, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, CSI, a PMI, a QoS, and the number of antennas included in a feedback message received from the UE. The operation related to the operation of transmitting and receiving the signal in the wireless communication system supporting the SWSC MIMO scheme according to an embodiment of the present disclosure, e.g., the operation of determining, by the BS, the number of streams and the structure of the sliding-window superposition coding layer, the QAM combination according to the number of streams and the structure of the sliding-window superposition coding layer, the layer of the QAM modulation layer, and the beamforming matrix delivering each SWSC superposition layer in order to generate the desired achievable rate region based on the CQI, the CSI, the PMI, the QoS, and the number of antennas included in the feedback message received from the UE has been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed operation thereof will be omitted herein. The QAM combination according to the number of streams and the structure of the sliding-window superposition coding layer may be implemented based on a mapping scheme, the mapping scheme has been described above, and a detailed description thereof will be omitted herein.

The transmitter 3111 transmits various signals and various messages to other entities, e.g., a UE, and/or the like in the wireless communication system using the SWSC MIMO scheme under a control of the controller 3113. The various signals and various messages transmitted in the transmitter 3111 have been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed description thereof will be omitted herein.

The receiver 3115 receives various signals and various messages from other entities, e.g., a UE, and/or the like in the wireless communication system using the SWSC MIMO scheme under a control of the controller 3113. The various signals and various messages received in the receiver 3115 have been described with reference to FIGS. 1, 2, 3, 4, 5, 6, 7, 8, 9, 10, 11, 12, 13, 14, 15, 16, 17, 18, 19, 20, 21, 22, 23, 24A, 24B, 25A, 25B, 25C, 25D, 26, and 27, and a detailed description thereof will be omitted herein.

The storage unit 3117 stores various programs, various data, and/or the like related to an operation related to an operation of transmitting and receiving a signal in a wireless communication system supporting an SWSC MIMO scheme according to an embodiment of the present disclosure, e.g., an operation of determining, by a BS, the number of streams and a structure of a sliding-window superposition coding layer, a QAM combination according to the number of streams and the structure of the sliding-window superposition coding layer, a layer of a QAM modulation layer, and a beamforming matrix delivering each SWSC superposition layer in order to generate a desired achievable rate region based on a CQI, CSI, a PMI, a QoS, and the number of antennas included in a feedback message received from the UE, performed in the BS 3100 under a control of the controller 3113.

The storage unit 3117 stores various signals and various messages which are received by the receiver 3115 from the UE, and/or the like.

While the transmitter 3111, the controller 3113, the receiver 3115, and the storage unit 3117 are described in the BS 3100 as separate units, it is to be understood that this is merely for convenience of description. In other words, two or more of the transmitter 3111, the controller 3113, the receiver 3115, and the storage unit 3117 may be incorporated into a single unit.

The BS 3100 may be implemented with one processor.

In accordance with various embodiments of the present disclosure, an operating method of a transmitting apparatus in a wireless communication system is provided. The operating method includes detecting an achievable rate region for a receiving apparatus, and determining an MCS level and an SWSC MIMO scheme corresponding to the achievable rate region, wherein the achievable rate region is determined based on a precoding matrix which is generated based on a channel matrix between each of the transmitting apparatus and other transmitting apparatus and the receiving apparatus.

Preferably, the determining of the SWSC MIMO scheme comprises determining a structure of a sliding-window superposition coding layer used in the SWSC MIMO scheme.

Preferably, the determining of the SWSC MIMO scheme comprises determining a modulation scheme combination according to the sliding-window superposition coding layer.

Preferably, the modulation scheme is a QAM scheme.

Preferably, the determining of the modulation scheme combination according to the sliding-window superposition coding layer comprises determining the modulation scheme combination based on a number of sliding-window superposition coding layers used in the SWSC MIMO scheme, a number of antennas used in the transmitting apparatus, and a number of bits included in a modulation symbol according to the modulation scheme.

Preferably, the modulation scheme is a QAM scheme.

Preferably, the determining of the SWSC MIMO scheme comprises determining a modulation layer for the modulation scheme.

Preferably, the modulation scheme is a QAM scheme.

Preferably, the determining of the SWSC MIMO scheme comprises determining a beamforming matrix transferring an SWSC superposition layer signal.

Preferably, the modulation scheme is a QAM scheme.

Preferably, the operating method further comprises transmitting information about the determined SWSC MIMO scheme to the receiving apparatus.

Preferably, the detecting of the achievable rate region for the receiving apparatus comprises detecting the achievable rate region for the receiving apparatus based on at least one of a CQI, CSI, a PMI, and a QoS received from the receiving apparatus.

In accordance with various embodiments of the present disclosure, an operating method of a receiving apparatus in a wireless communication system is provided. The operating method includes receiving a signal from a transmitting apparatus, wherein the signal is transmitted by the transmitting apparatus based on an MCS level and an SWSC MIMO scheme corresponding to an achievable rate region for the receiving apparatus, and wherein the achievable rate region is determined based on a precoding matrix which is generated based on a channel matrix between each of the transmitting apparatus and other transmitting apparatus and the receiving apparatus.

Preferably, the SWSC MIMO scheme is determined based on a structure of a sliding-window superposition coding layer used in the SWSC MIMO scheme.

Preferably, the SWSC MIMO scheme is determined based on a modulation scheme combination according to the sliding-window superposition coding layer.

Preferably, the modulation scheme is a QAM scheme.

Preferably, a modulation scheme combination according to the sliding-window superposition coding layer is determined based on a number of sliding-window superposition coding layers used in the SWSC MIMO scheme, a number of antennas used in the transmitting apparatus, and a number of bits included in a modulation symbol according to the modulation scheme.

Preferably, the modulation scheme is a QAM scheme.

Preferably, the SWSC MIMO scheme is determined based on a modulation layer for the modulation scheme.

Preferably, the modulation scheme is a QAM scheme.

Preferably, the SWSC MIMO scheme is determined based on a beamforming matrix transferring an SWSC superposition layer signal.

Preferably, the modulation scheme is a QAM scheme.

Preferably, the operating method further comprises receiving information about the SWSC MIMO scheme from the transmitting apparatus.

Preferably, the achievable rate region for the receiving apparatus is detected based on at least one of a CQI, CSI, a PMI, and a QoS received from the receiving apparatus.

In accordance with various embodiments of the present disclosure, an operating method of a receiving apparatus in a wireless communication system is provided. The operating method includes receiving a signal from a transmitting apparatus, wherein the signal is transmitted by the transmitting apparatus based on a modulation and coding scheme (MCS) level and a sliding window superposition coding (SWSC) multi-input multi-output (MIMO) scheme corresponding to an achievable rate region for the receiving apparatus, and wherein the achievable rate region is determined based on a precoding matrix which is generated based on a channel matrix between each of the transmitting apparatus and other transmitting apparatus and the receiving apparatus.

In accordance with various embodiments of the present disclosure, an operating method of a transmitting apparatus in a wireless communication system is provided. The operating method includes detecting an achievable rate region for a receiving apparatus, and determining an MCS level and an SWSC MIMO scheme corresponding to the achievable rate region, wherein the achievable rate region is determined based on a precoding matrix which is generated based on a channel matrix between each of the transmitting apparatus and other transmitting apparatus and the receiving apparatus.

In accordance with various embodiments of the present disclosure, at least one non-transitory machine-readable storage medium for storing a computer program of instructions configured to be readable by at least one processor for instructing the at least one processor to execute a computer process for performing an operating method is provided. The operating method includes receiving a signal from a transmitting apparatus, wherein the signal is transmitted by the transmitting apparatus based on an MCS level and an SWSC MIMO scheme corresponding to an achievable rate region for the receiving apparatus, and wherein the achievable rate region is determined based on a precoding matrix which is generated based on a channel matrix between each of the transmitting apparatus and other transmitting apparatus and the receiving apparatus.

As is apparent from the foregoing description, an embodiment of the present disclosure enables to transmit and receive a signal in a wireless communication system using an SWSC MIMO scheme.

An embodiment of the present disclosure enables to transmit and receive a signal by effectively combining an SWSC MIMO scheme thereby increasing efficiency for signal transmission and reception in a wireless communication system using an SWSC MIMO scheme.

An embodiment of the present disclosure enables to transmit and receive a signal thereby increasing throughput of UEs which are located at a cell edge region in a wireless communication system using an SWSC MIMO scheme.

An embodiment of the present disclosure enables to transmit and receive a signal thereby preventing performance degradation due to interference from a neighbor cell in a wireless communication system using an SWSC MIMO scheme.

An embodiment of the present disclosure enables to transmit and receive a signal thereby decreasing complexity in a wireless communication system using an SWSC MIMO scheme.

An embodiment of the present disclosure enables to transmit and receive a signal thereby increasing spectrum efficiency in a wireless communication system using an SWSC MIMO scheme.

An embodiment of the present disclosure enables to transmit and receive a signal based on an achievable data region in a wireless communication system using an SWSC MIMO scheme.

An embodiment of the present disclosure enables to transmit and receive a signal by adaptively applying a modulation scheme in a wireless communication system using an SWSC MIMO scheme.

An embodiment of the present disclosure enables to transmit and receive a signal by adaptively applying a mapping scheme in a wireless communication system using an SWSC MIMO scheme.

An embodiment of the present disclosure enables to transmit and receive a signal by adaptively applying a superposition scheme in a wireless communication system using an SWSC MIMO scheme.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include ROM, RAM, CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

It can be appreciated that a method and an apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and an apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A base station (BS) using a multi-input multi-output (MIMO) scheme in a wireless communication system, the BS comprising:
    a processor configured to:
        determine achievable rate regions which are supportable for a user equipment (UE) at the BS based on a feedback message including a channel quality indicator (CQI), channel state information (CSI), a precoding matrix indicator (PMI), or quality of service (QoS),
        select a first achievable rate region among the achievable rate regions based on a number of antennas used in the BS, and at least one of the CQI, CSI, PMI, or QoS, and
        determine a modulation and coding scheme (MCS) level and a sliding window superposition coding (SWSC) MIMO scheme corresponding to the first achievable rate region; and
    a transceiver configured to:
        receive, from the UE, the feedback message, and
        transmit, to the UE, a signal based on the SWSC MIMO scheme,
    wherein the SWSC MIMO scheme includes a structure of SWSC superposition layers, a combination of modulation schemes according to the structure of SWSC superposition layers, modulation layers of the combination of modulation schemes, and beamforming matrices, and
    wherein each of the beamforming matrices transfers a signal of an associated SWSC superposition layer.

2. The BS of claim 1, wherein the processor is to determine the combination of the modulation schemes based on the number of the SWSC superposition layers, the number of antennas, and a number of bits included in a modulation symbol according to the combination of modulation schemes.

3. The BS of claim 1, wherein the modulation schemes include a pulse amplitude modulation (PAM) scheme, a 4-PAM scheme, a binary phase shift keying (BPSK) scheme, a quadrature phase shift keying (QPSK) scheme, a quadrature amplitude modulation (QAM) scheme, a 16-QAM scheme, and a 64-QAM scheme.

4. The BS of claim 1, wherein the PMI is determined based on a channel matrix between each of the BS and another BS and the UE.

5. A user equipment (UE) using a multi-input multi-output (MIMO) scheme in a wireless communication system, the UE comprising:
    a transceiver; and
    a processor configured to:
        control the transceiver to transmit, to a base station (BS), a feedback message including a channel quality indicator (CQI), channel state information (CSI), a precoding matrix indicator (PMI) or a quality of service (QoS),
        control the transceiver to:
            receive, from the BS, information about a modulation and coding scheme (MCS) level and a sliding window superposition coding (SWSC) MIMO scheme corresponding to a first achievable rate region for the UE, and
            receive a signal from the BS, and
        decode the signal based on the information to recover a desired signal,
    wherein the signal is transmitted by the BS based on the MCS level and the SWSC MIMO scheme corresponding to the first achievable rate region for the UE,
    wherein the first achievable rate region is selected from achievable rate regions which are supportable for the UE at the BS based on a number of antennas used in the BS, and at least one of the CQI, CSI, PMI, or QoS, and the achievable rate regions are determined based on the feedback message, and wherein the SWSC MIMO scheme includes a structure of SWSC superposition layers, a combination of modulation schemes according to the structure of SWSC superposition layers, modulation layers of the combination of modulation schemes, and beamforming matrices, and wherein each of the beamforming matrices transfers a signal of an associated SWSC superposition layer.

6. The UE of claim 5, wherein the combination of the modulation schemes is determined based on the number of the SWSC superposition layers, the number of antennas, and a number of bits included in a modulation symbol according to the combination of modulation schemes.

7. The UE of claim 5, wherein the modulation schemes include a pulse amplitude modulation (PAM) scheme, a 4-PAM scheme, a binary phase shift keying (BPSK) scheme, a quadrature phase shift keying (QPSK) scheme, a quadrature amplitude modulation (QAM) scheme, a 16-QAM scheme, and a 64-QAM scheme.

8. The UE of claim 5, wherein the PMI is determined based on a channel matrix between each of the BS and another BS.

* * * * *